United States Patent
Yamaguchi et al.

(10) Patent No.: US 6,654,580 B2
(45) Date of Patent: Nov. 25, 2003

(54) IMAGE FORMING APPARATUS

(75) Inventors: Naoki Yamaguchi, Kasuga (JP); Masaya Shimada, Onojo (JP); Yuzo Kawano, Ogori (JP); Kazuhiko Tajima, Chikushino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 22 days.

(21) Appl. No.: 10/020,962

(22) Filed: Dec. 19, 2001

(65) Prior Publication Data

US 2002/0085858 A1 Jul. 4, 2002

(30) Foreign Application Priority Data

Dec. 27, 2000 (JP) .................................. 2000-397680
Jan. 9, 2001 (JP) .................................. 2001-001070

(51) Int. Cl.[7] .............................................. G03G 15/00
(52) U.S. Cl. ....................................................... 399/167
(58) Field of Search .......................... 399/167, 162–163

(56) References Cited

U.S. PATENT DOCUMENTS 5,023,660 A * 6/1991 Ebata et al. ................ 399/167
6,285,847 B1   9/2001 Tanizaki et al.

FOREIGN PATENT DOCUMENTS

| JP | 06258877 | 9/1994 |
|----|----------|--------|
| JP | 07225538 | 8/1995 |
| JP | 08087225 | 4/1996 |
| JP | 08262826 | 10/1996 |
| JP | 10090967 | 4/1998 |
| JP | 11002935 | 1/1999 |
| JP | 11007173 | 1/1999 |
| JP | 11015275 | 1/1999 |
| JP | 2000075765 | 3/2000 |
| JP | 2000284592 | 10/2000 |

* cited by examiner

*Primary Examiner*—Quana M. Grainger
(74) *Attorney, Agent, or Firm*—Stevens, Davis, Miller & Mosher, LLP

(57) ABSTRACT

An image forming apparatus includes an image carrier, a driving unit for transmitting a driving force to the image carrier via a driving spline, and a plurality of members to be driven for driving the driving force transmitted from the driving unit via the image carrier. A shaft is disposed coaxially with a rotation shaft of the image carrier in one end of the image carrier. An involute spline-shaped follower spline to which the driving force is transmitted from the driving unit via the driving spline is formed on an inner peripheral surface of the flange, and a driving force transmitter for transmitting the driving force to at least one of the member to be driven is formed on an outer peripheral surface of the flange.

34 Claims, 33 Drawing Sheets

IMAGE FORMING APPARATUS

BACKGROUND OF THE INVENTION

The present invention relates to an image forming apparatus in which an electrophotographic technique and the like are utilized to transfer image information onto a transfer material and to form an image, particularly to driving connection of the image forming apparatus.

DESCRIPTION OF RELATED ART

In a conventional image forming apparatus in which an electrophotographic technique has heretofore been employed, an electrophotographic photoconductor served as an image carrier is charged by a charging unit, and irradiated with light corresponding to the image information, to form a latent image thereon. A toner image formed by developing the latent image by a developing unit is transferred to a sheet material and the like so that the image is formed.

In such an image forming apparatus, there is a technical problem as to minimizing an image jitter, density unevenness and transfer position deviation. Examples of factors which determines such properties include a speed fluctuation of the photoconductor, and it is very important to develop a driving unit having little speed fluctuation.

A driving system of a conventional image forming apparatus will be described hereinafter with reference to FIGS. 26 and 27. FIG. 26 is a perspective view showing a driving unit and a photoconductor drum of the conventional image forming apparatus, and FIG. 27 is an explanatory view showing an engagement state of a driving spline and a follower spline of FIG. 26.

In FIG. 26, a driving unit 2 has involute spline shafts (driving splines) 18 for transmitting a rotation force to photoconductor drums (photoconductors) 1a to 1d as image carriers. The involute spline shaft 18 is rotated by a driving motor (not shown) via a reduction mechanism (not shown). The rotation force of the spline shaft is transmitted to each of involute spline holes (follower spline) 19 mounted on rotation shafts of the photoconductor drums 1a to 1d, so that the photoconductor drums 1a to 1d are rotated.

However, there is looseness in the spline engagement between the involute spline shaft 18 and the involute spline hole 19. Particularly, with respect to the looseness of a peripheral direction, the photoconductor drums 1a to 1d are moved by the looseness when a load fluctuates. This generates an image jitter, density unevenness, and transfer position deviation.

In actual, various mechanisms are necessary for forming the images in peripheries of the photoconductor drums 1a to 1d. Examples of such the mechanisms include developing means (not shown) for developing electrostatic latent images formed on the photoconductor drums 1a to 1d, transfer means (not shown) for transferring the toner images developed on the photoconductor drums 1a to 1d to a transfer material, and the like. Rotations of the photoconductor drums 1a to 1d are influenced by rotation and load fluctuations of these mechanisms, and the drums are easily moved.

To solve the problem, as shown in FIG. 26, torque limitters 21a, 21b, 21c, 21d are attached as load means to the photoconductor drums 1a to 1d. The looseness of the peripheral direction in the spline engagement between the involute spline shaft 18 and the involute spline hole 19 is constantly removed in one direction, that is, a rotation direction P as shown in FIG. 27, so that the photoconductor drums 1a to 1d steadily rotate.

However, of the photoconductor drum requires the load means such as the torque limitters 21a, 21b, 21c, 21d for constantly displacing the engagement looseness in the peripheral direction of the spline in one direction. Therefore, in the aforementioned conventional driving technique, there is a first problem that a driving force increases, the driving unit is enlarged, and cost-up is caused.

Particularly, in a multi-image forming apparatus of a tandem system including a plurality of photoconductor drums, and the like, since the number of load means corresponding to the number of photoconductor drums are necessary, the driving force largely increases, and the problem becomes very large.

Moreover, the influence of the engagement looseness in the peripheral direction is reduced or canceled by the load means such as the torque limitter, but the looseness in a radius direction remains. Due to the looseness, rotation centers of the follower spline and a driving spline deviate, the rotation of the driving spline is not exactly transmitted to the follower spline, and the rotation fluctuation of the photoconductor drum is caused. Thus, there is a second problem that the image jitter, density unevenness, and transfer position deviation are generated.

Particularly, in the multi-image forming apparatus of the tandem system including the plurality of photoconductor drums, since the transfer position deviation results in color deviation, the problem becomes very serious.

Moreover, for color images, a large number of image forming apparatuses of the tandem system have heretofore been proposed in which a plurality of image carriers with the aforementioned series of image forming process developed therein is included, and respective color images such as cyan, magenta, and yellow images, and preferably a black image are formed on the respective image carriers, and are superposed and transferred onto a sheet material in transfer positions of the respective image carriers, to form a full-color image. The multi-image forming apparatus of the tandem system is said to be advantageous for a high speed because respective image forming sections are disposed for the respective colors.

For example, as described in specifications proposed by the present applicant and filed as JP-A-2000-284592, the multi-image forming apparatus of the tandem system includes: image forming units for forming toner images of respective colors such as yellow (Y), magenta (M), cyan (C), and black (K); an exposure unit for outputting an image signal and forming an electrostatic latent image; an intermediate transfer belt formed and run in a closed loop shape; and a fixing unit. The toner images on the intermediate transfer belt are transferred onto the sheet material supplied from a sheet cassette and fixed onto the sheet material by the fixing unit.

Since the respective image forming units of yellow (Y), magenta (M), cyan (C), and black (K) have a common structure, one of the image forming units is shown in FIG. 28.

As shown in FIG. 28, the image forming unit is a combination of: a photoconductor unit including a photoconductor drum 102 having a peripheral surface with an electrostatic latent image formed thereon by a laser beam 109d of an exposure unit 106d, charging means 134 for charging the photoconductor drum 102, and cleaning means 126 for removing a residual toner from the surface of the photoconductor drum 102; and a developing unit including a toner supply roller 122 for supplying toner to a developing roller 121 which contacts the photoconductor drum 102, and a layer thinning blade 123, disposed in contact with the developing roller 121, for uniformly thinning a toner layer and charging the toner layer at a predetermined potential.

In the image forming unit, the electrostatic latent image of image information is formed on the photoconductor drum 102 by the exposure unit 106d. The electrostatic latent image is visualized as the toner image by the developing roller 121, and transferred onto the intermediate transfer belt. Moreover, in the four-colors image forming apparatus, the respective color toner images are transferred onto the intermediate transfer belt and the multi-color image is finally formed.

A conventional technique will be described hereinafter with reference to the drawings.

FIGS. 29 to 33 are perspective views showing a part of the conventional image forming apparatus in detail.

As shown in FIG. 29, for driving transmission of the photoconductor drum 102 in the conventional image forming apparatus, a gear driving system is used in many cases. In the system, a gear is formed on a driving-side flange 129d press-fitted coaxially with a rotation shaft of the photoconductor drum 102 in one end of the photoconductor drum 102, and further a driving pulley 128a which meshes with the gear is disposed. The driving force is transmitted by one or a plurality of driving motors disposed on a driving side of the apparatus via the driving pulley 128a.

When driving is transmitted by the gears in this manner, there is a problem that a counterforce by which the gears tries to be detached from each other is generated, and thus, the photoconductor drum 102 vibrates, a writing position of the electrostatic latent image onto the photoconductor drum 102 fluctuates, and the deviation is generated in the image.

In recent years, to solve the problem, as shown in FIG. 30, an involute spline driving system has been used, in which an internal involute spline is formed on an inner peripheral surface of a driving-side flange 129c press-fitted coaxially with the rotation shaft of the photoconductor drum 102 in the end of the photoconductor drum 102, and an external involute spline is formed correspondingly to the internal involute spline in a driving pulley 128 disposed coaxially with the photoconductor drum 102, so that the driving is transmitted at a high precision.

In the involute spline driving system, the driving force supplied by one or a plurality of driving motors disposed on the driving side of the apparatus is transmitted to the driving-side flange 129c press-fitted in the photoconductor drum 102 via the driving pulley 128. Moreover, with respect to the driving transmission to other members to be driven, as shown in FIG. 31, the driving force is transmitted to a developing roller gear 131b fixed to the developing roller 121 from the gear formed on a non-driving side flange 130b press-fitted in the photoconductor drum 102. Moreover, as shown in FIG. 32, the force is transmitted to a charging means gear 132b fixed to the charging means 134. Furthermore, as shown in FIG. 33, the force is transmitted to a disposal toner carrying screw gear 133b fixed to a disposal toner carrying screw 127.

According to the constitution, a gear needs to be formed on a non-driving side flange, and thus, high cost results.

Moreover, since the gear for transmitting the driving force needs to be disposed also on the non-driving side, a large space is necessary.

As described above, in the conventional image forming apparatus, there is a third problem of a high cost and large space in distributing the driving force transmitted to the photoconductor drum.

SUMMARY OF THE INVENTION

In the first problem as mentioned above, an object of the present invention is to provide an image forming apparatus which can cancel looseness of a peripheral direction of a driving spline and a follower spline without using any load means.

In the second problem, an object of the present invention is to provide an image forming apparatus which can cancel looseness of a radius direction of the driving spline and the follower spline without using any load means.

In order to solve the first and second problems, according to a first aspect of the present invention, there is provided an image forming apparatus comprising: an image carrier; a driving unit for transmitting a driving force to the image carrier via a driving spline; and a plurality of members to be driven for receiving the driving force transmitted from the driving unit via the image carrier. The image forming apparatus further comprises a follower spline attached onto a rotation shaft of the image carrier. The follower spline is positioned and connected to the driving spline so that the follower spline contacts the driving spline by tooth surfaces on opposite sides and gaps are formed between a tooth tip and a tooth root of the follower spline and the driving spline. The driving force of the driving unit transmitted from the driving spline is transmitted to the photoconductor so that the photoconductor is rotated.

Moreover, in order to solve the first and second problems, according to a second aspect of the present invention, there is provided an image forming apparatus comprising: an image carrier; a driving unit for transmitting a driving force to the image carrier via a driving spline; and a plurality of members to be driven for receiving the driving force transmitted from the driving unit via the image carrier. The image forming apparatus further comprises a follower spline attached onto a rotation shaft of the image carrier. The follower spline is positioned and connected to the driving spline so that the follower spline contacts the driving spline by tooth surfaces on opposite sides, a root portion of the follower spline also contacts a tooth tip of the driving spline, and a gap is formed between the tooth tip of the follower spline and the driving spline. The driving force of the driving unit transmitted from the driving spline is transmitted to the image carrier so that the image carrier is rotated.

With these constitutions, since the looseness in the peripheral direction of the driving spline and the follower spline can be canceled, the load means such as a torque limitter is abolished, a driving load can be reduced, and miniaturization of an image carrier driving system and cost reduction can be achieved.

Moreover, since the looseness in the radius direction can be also canceled, and a rotation center of the driving spline is allowed to coincide with a rotation center of the follower spline with good precision, an angular speed fluctuation is reduced or canceled. Thus, it is possible to reduce or cancel jitter, density unevenness, and transfer position deviation of an AC component at a low cost under a simple structure.

Furthermore, in the first and second aspects, a diameter of the tooth tip in the driving spline at a tip end side in a rotation axial direction, i.e. at the follower spline side, may be set to be smaller than that at the root portion in the rotation axial direction, i.e. at the driving unit side. A tooth width in the driving spline at the tip end in the rotation axial direction, i.e. at the follower spline side, may be set to be smaller than that at the root portion in the rotation axial direction, i.e. at the driving unit side. Thus, a step may be disposed in this manner. Additionally, the diameter of the tooth tip or the tooth width in the driving spline may be gradually reduced toward the tip end from the root portion or a middle portion between the root portion and the tip end in the rotation axial direction of the driving spline so that a taper may be made.

Furthermore, a tooth shape of an involute spline as the force receiving means could be replaced for various tooth shapes of spline; i.e., a round tooth shape spline, a rectangle tooth shape one or the like.

Moreover, in order to solve the above-mentioned third problem, according to a third aspect of the present invention, there is provided an image forming apparatus comprising: an image carrier; a driving unit for transmitting a driving force to the image carrier; and a flange disposed coaxially with a rotation shaft of the image carrier in one end of the image carrier. A driving force receiving means to which the driving force is transmitted from the driving unit is formed on an inner peripheral surface of the flange, and driving force transmission means for transmitting the driving force to at least one of a plurality of members to be driven for receiving the driving force transmitted from the driving unit via the flange is formed on an outer peripheral surface of the flange.

Furthermore, in order to solve the above-mentioned third problem, according to a fourth aspect of the present invention, there is provided an image forming apparatus comprising: an image carrier; a driving unit for transmitting a driving force to the image carrier; and a flange disposed coaxially with a rotation shaft of the image carrier in one end of the image carrier. An involute spline shape to which the driving force is transmitted from the driving unit is formed on an inner peripheral surface of the flange, and driving force transmission means for transmitting the driving force to at least one of a plurality of members to be driven for receiving the driving force transmitted from the driving unit via the flange is formed on an outer peripheral surface of the flange.

With the constitutions, it is unnecessary to form the driving force transmission means in a flange on a driven side. While low cost is realized, it is possible to transmit the driving force to another member or other members to be driven at high precision.

Moreover, since the gears are concentrated only on the driving side, space saving is achieved, and it is also possible to transmit the driving force to another member to be driven at high precision.

Furthermore, in the third and fourth aspects, the image carrier may be a photoconductor drum, and the member to be driven may be a developing roller, charging means, or disposal toner screw.

Moreover, in order to solve the above-mentioned first, second, and third problems, according to a fifth aspect of the present invention, there is provided an image forming apparatus comprising: an image carrier; a driving unit for transmitting a driving force to the image carrier via a driving spline; and a plurality of members to be driven for receiving the driving force transmitted from the driving unit via the image carrier. The image forming apparatus further comprises a driving-side flange disposed coaxially with a rotation shaft of the image carrier in one end of the image carrier. A follower spline having an involute spline shape to which the driving force is transmitted from the driving unit via a driving spline is formed on an inner peripheral surface of the driving-side flange, and driving force transmission means having a predetermined gear shape for transmitting the driving force to at least one of the members to be driven is formed on an outer peripheral surface of the flange.

Furthermore, the follower spline of the driving-side flange attached onto the rotation shaft of the image carrier is positioned and connected to the driving spline so that the follower spline contacts the driving spline by tooth surfaces on opposite sides and gaps are formed between a tooth tip and a tooth root of the follower spline and the driving spline. The driving force of the driving unit transmitted from the driving spline is transmitted to the image carrier so that the image carrier is rotated.

Moreover, to solve the first, second, and third problems, according to a sixth aspect of the present invention, there is provided an image forming apparatus comprising: an image carrier; a driving unit for transmitting a driving force to the image carrier via a driving spline; and a plurality of members to be driven for receiving the driving force transmitted from the driving unit via the image carrier. The image forming apparatus further comprises a driving-side flange disposed coaxially with a rotation shaft of the image carrier in one end of the image carrier. A follower spline having an involute spline shape to which the driving force is transmitted from the driving unit via the driving spline is formed on an inner peripheral surface of the driving-side flange, and driving force transmission means having a predetermined gear shape for transmitting the driving force to at least one of the members to be driven is formed on an outer peripheral surface of the flange. Moreover, the follower spline of the driving-side flange attached to the rotation shaft of the image carrier is positioned and connected to the driving spline so that the follower spline contacts the driving spline by tooth surfaces on opposite sides, a root portion of the follower spline also contacts a tooth tip of the driving spline, and a gap is formed between the tooth tip of the follower spline and the driving spline. The driving force of the driving unit transmitted from the driving spline is transmitted to the image carrier so that the image carrier is rotated.

According to these constitutions, since the looseness in the peripheral direction of the driving spline and the follower spline can be canceled, the load means such as a torque limitter is abolished, a driving load can be reduced, and miniaturization of an image carrier driving system and cost reduction can be achieved. Moreover, since the looseness in the radius direction can also be canceled, and a rotation center of the driving spline is allowed to coincide with a rotation center of the follower spline with good precision, an angular speed fluctuation is reduced or canceled. Thus, it is possible to reduce or cancel jitter, density unevenness, and transfer position deviation of an AC component at a low cost under a simple structure. Furthermore, it is unnecessary to form the driving force transmission means in a flange on a driven side. While low cost is realized, it is possible to transmit the driving force to another member or other members to be driven at high precision.

DETAILED DESCRIPTION OF THE PREFERRED EMBODIMENTS

Figure 1:
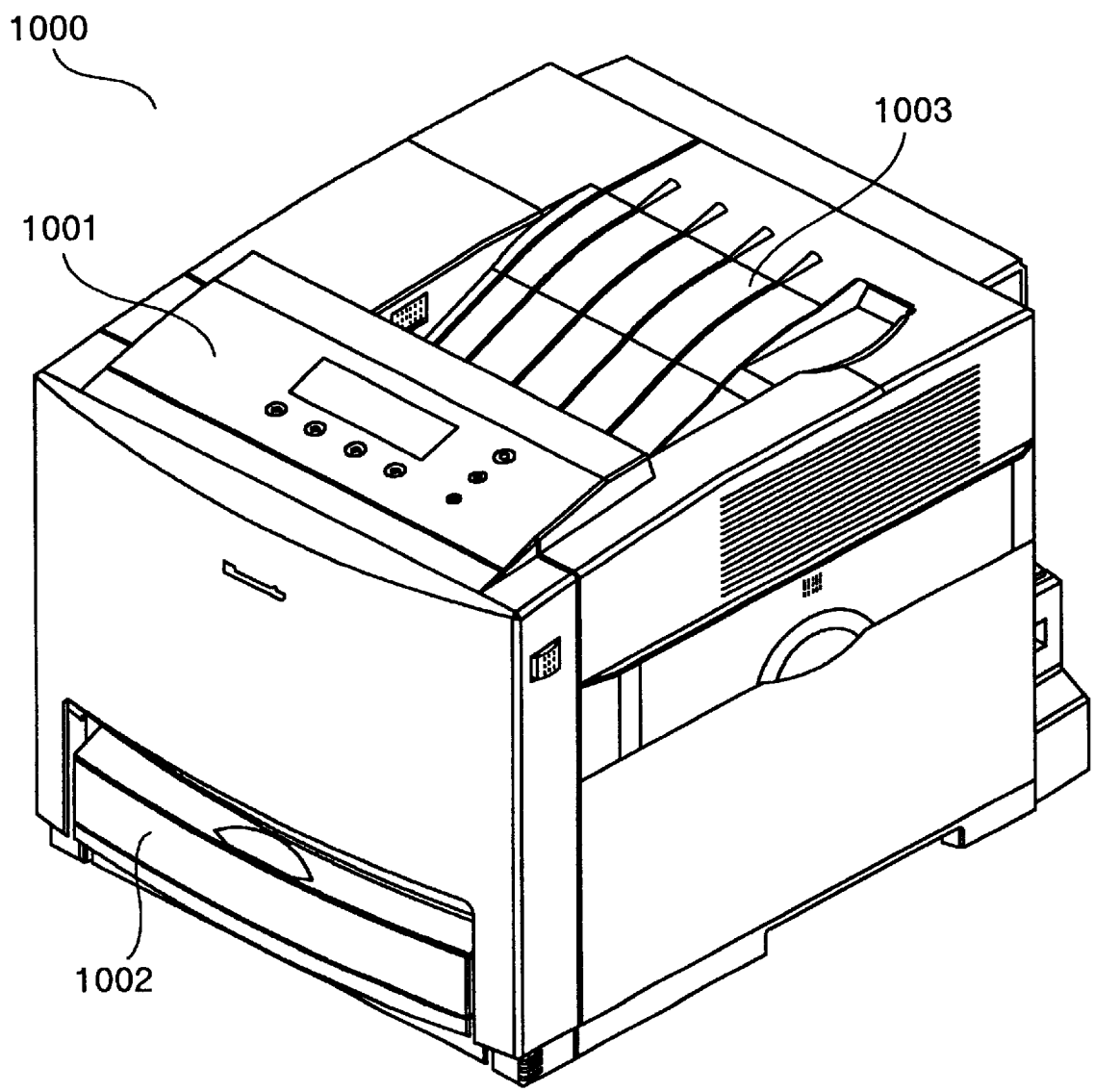
FIG. 1 is a schematic perspective view of an image forming apparatus according to the present invention.

Embodiments according to the present invention will be described hereinafter with reference to FIGS. 1 to 18. Additionally, the same member is denoted with the same reference numeral in these drawings, and redundant description is omitted.

In FIG. 1, reference numeral 1000 denotes a color image forming apparatus, 1001 denotes an operation panel for performing operations such as a sheet size selection, 1002 denotes a sheet tray in which printing sheets are stored, and 1003 denotes a sheet discharge tray to which a sheet with an image transferred thereto is discharged.

First Embodiment

Figure 2:
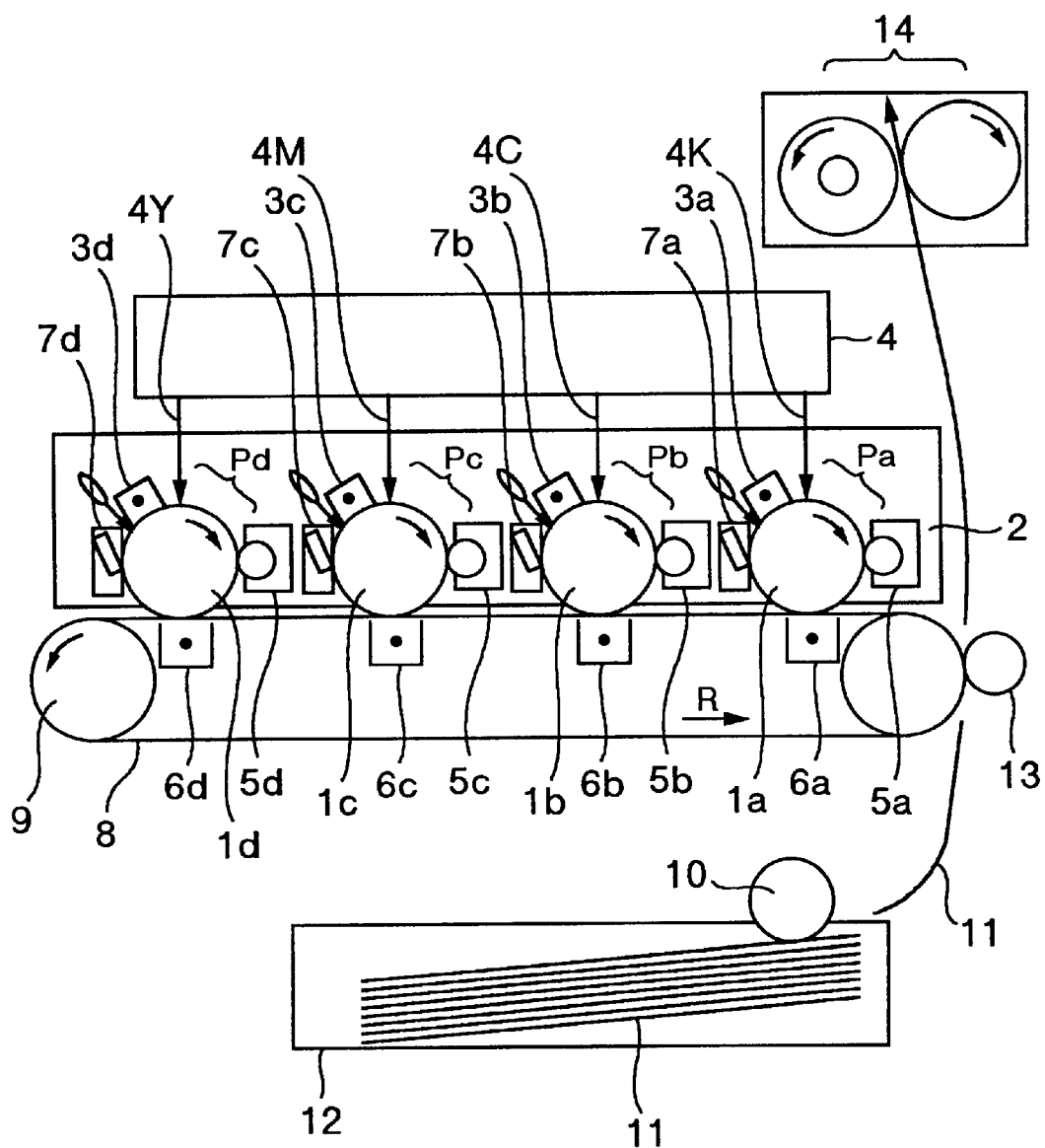
FIG. 2 is a schematic diagram showing a constitution of a first embodiment of the image forming apparatus in FIG. 1.
Figure 3:
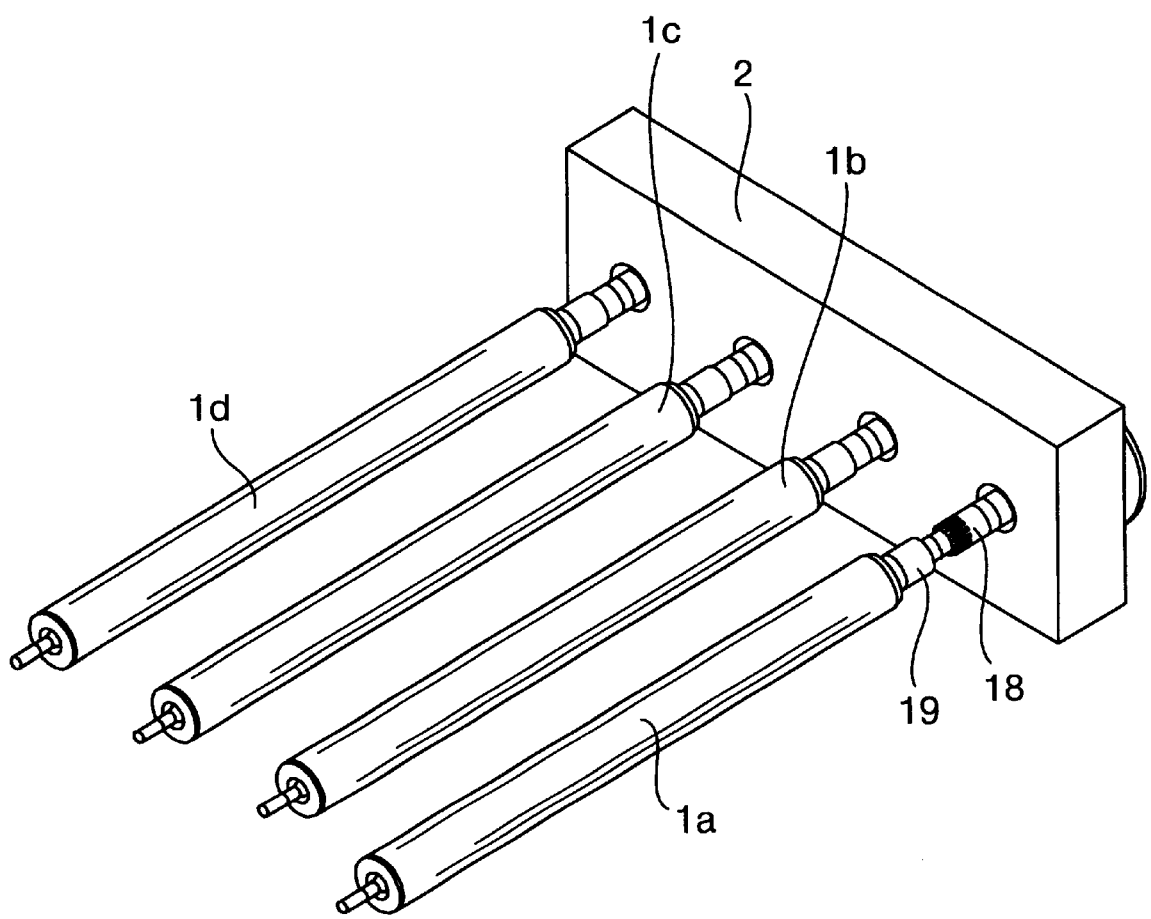
FIG. 3 is a perspective view showing a driving unit and a photoconductor drum in FIG. 2.
Figure 4:
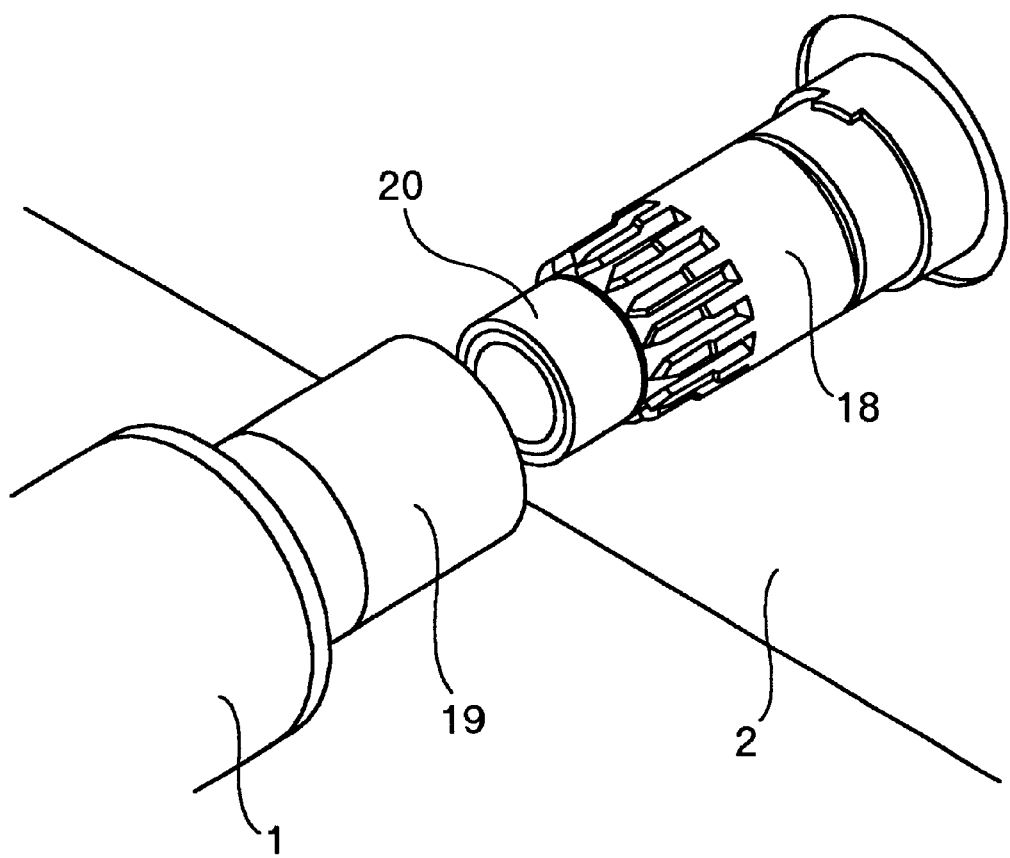
FIG. 4 is a perspective view showing a main part of FIG. 3.
Figure 5:
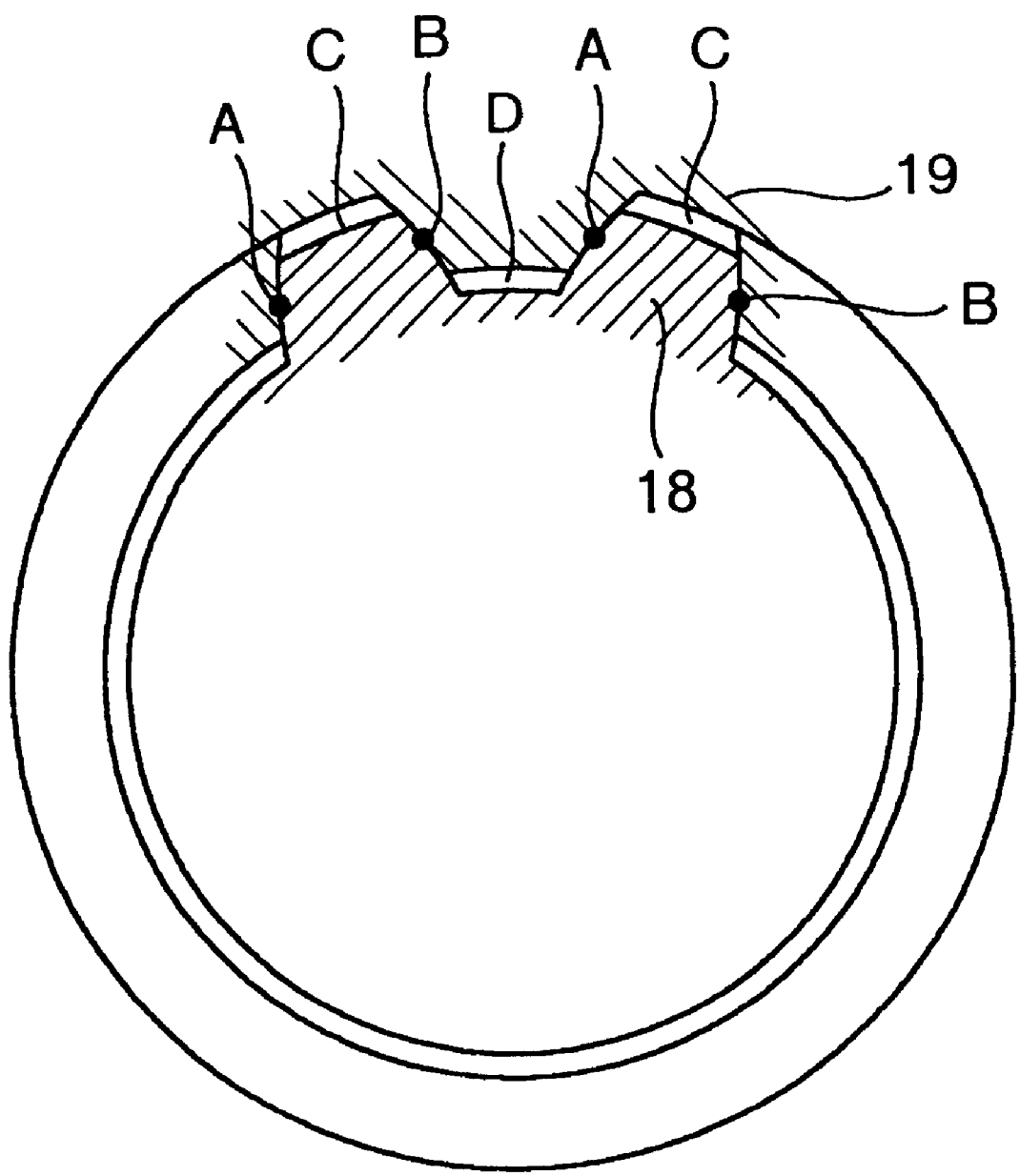
FIG. 5 is a sectional view showing an engagement state of a driving spline and a follower spline in FIG. 4.
Figure 6:
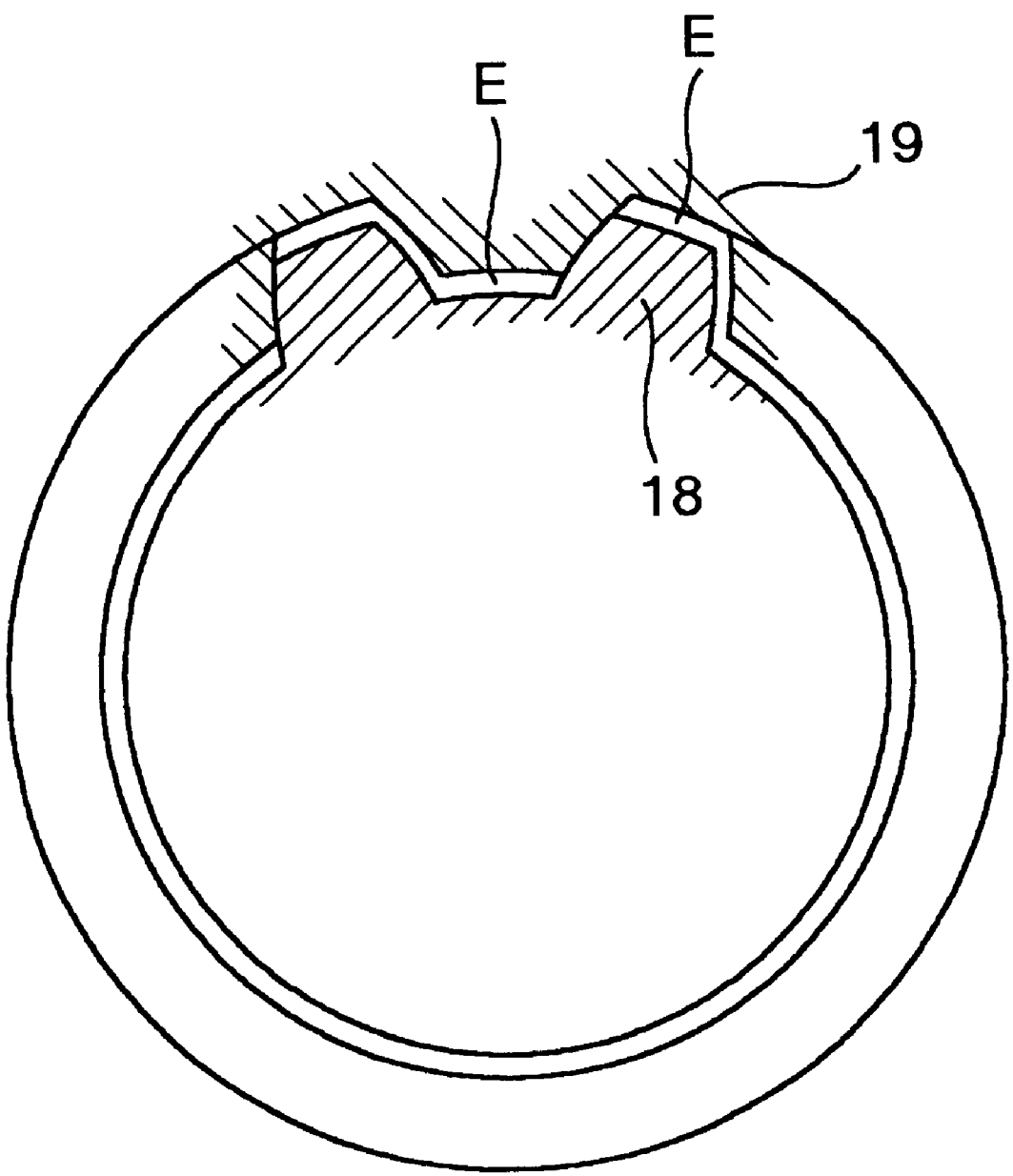
FIG. 6 is a sectional view showing looseness between the driving spline and the follower spline in a connected state.
Figure 7A:
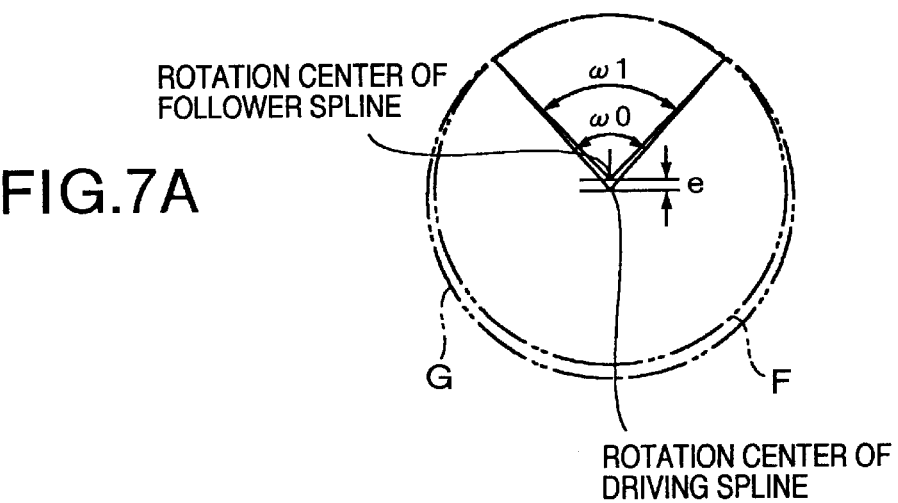
FIGS. 7A to 7C are explanatory views showing an angular speed fluctuation by deviation of a rotation center between the driving spline and the follower spline.
Figure 7B:
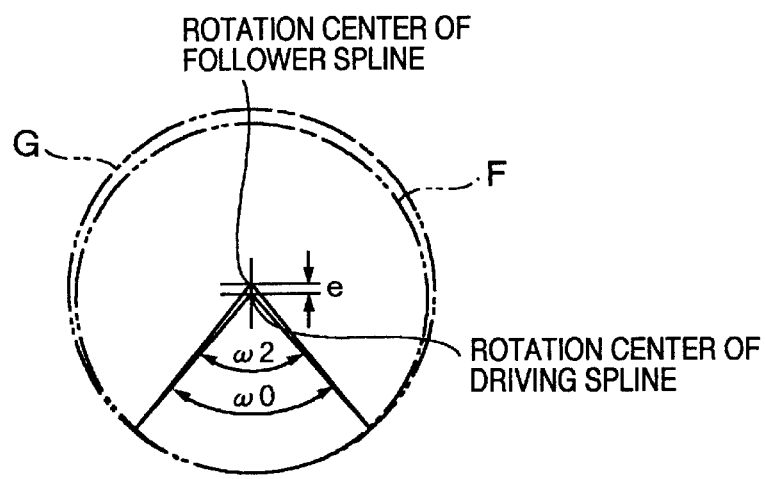
Figure 7C:
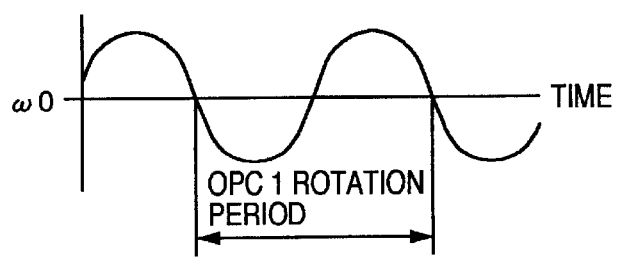
Figure 8A:
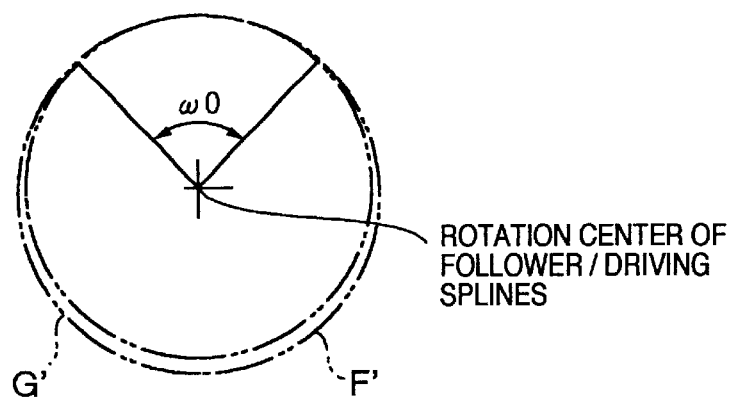
FIGS. 8A to 8C are explanatory views showing transmission of an angular speed by the driving spline and the follower spline according to the first embodiment of the present invention.
Figure 8B:
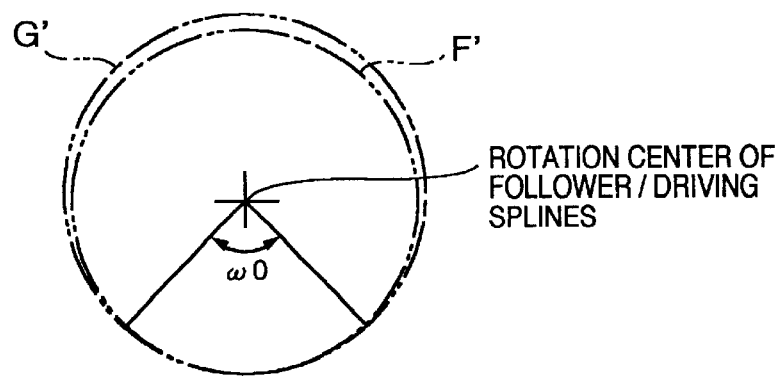
Figure 8C:
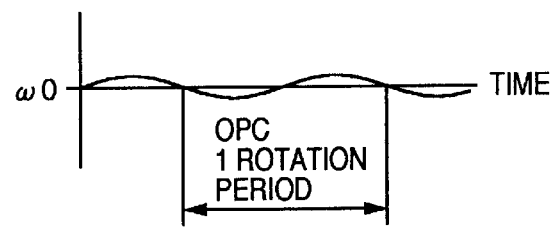
Figure 9:
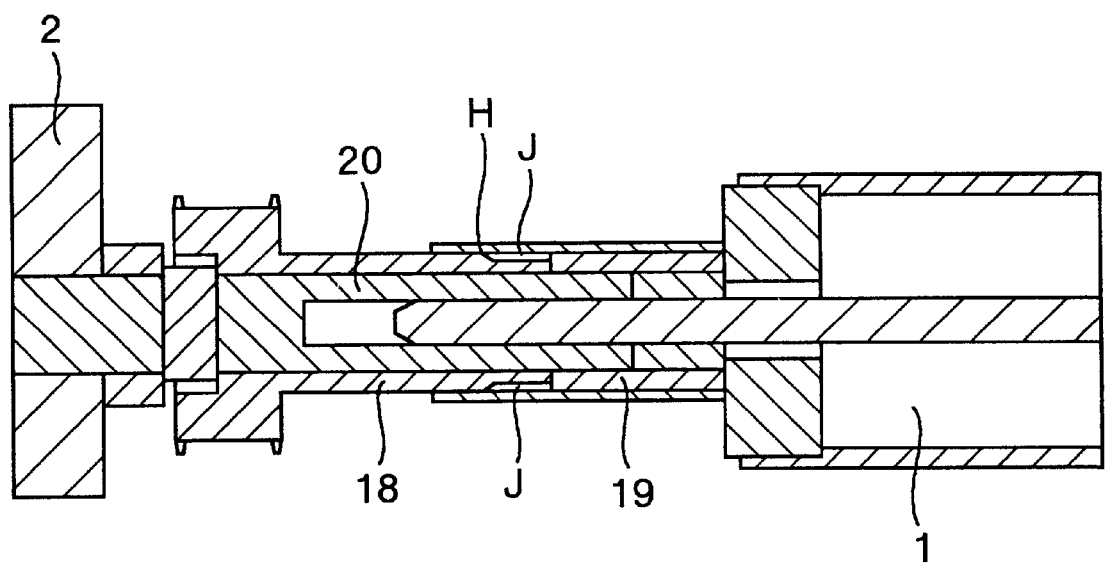
FIG. 9 is a sectional view showing the connected state of the driving spline and the follower spline.
Figure 10:
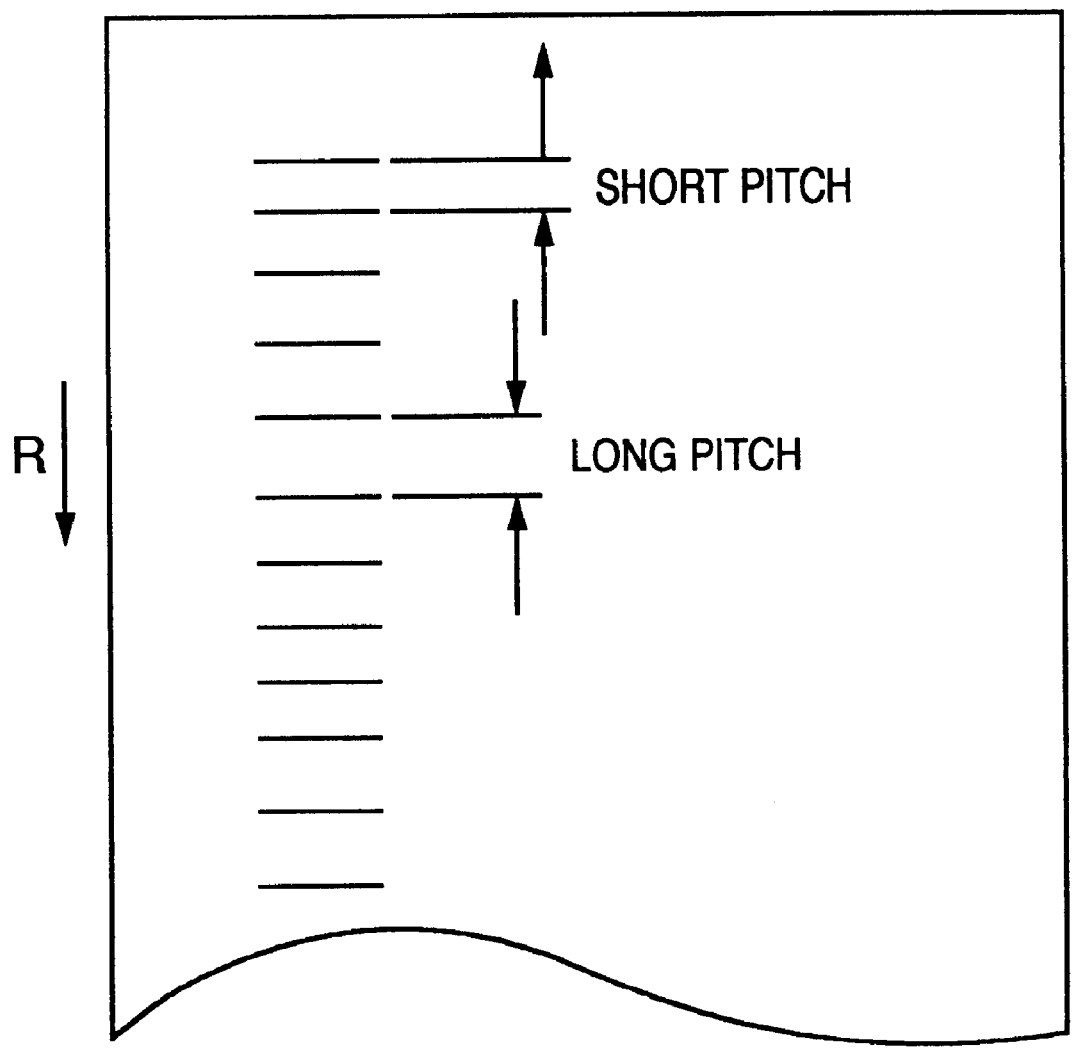
FIG. 10 is an explanatory view showing a state in which a pitch of a ladder pattern expands/contracts in a period of one rotation of the photoconductor drum.

FIG. 2 is an explanatory view showing a constitution of an image forming apparatus according to a first embodiment of the present invention, FIG. 3 is a perspective view showing a driving unit and a photoconductor drum of FIG. 2, FIG. 4 is a perspective view showing a main part of FIG. 3, FIG. 5 is a sectional view showing an engagement state of a driving spline and a follower spline of FIG. 4, FIG. 6 is a sectional view showing looseness between the driving spline and the follower spline in a connected state, FIGS. 7A, 7B, 7C are explanatory views showing an angular speed fluctuation by deviation of a rotation center of the driving spline and the follower spline, FIGS. 8A to 8C are explanatory views showing transmission of an angular speed by the driving spline and the follower spline according to the first embodiment of the present invention, FIG. 9 is a sectional view showing the connected state of the driving spline and the follower spline, and FIG. 10 is an explanatory view showing a state in which a pitch of a ladder pattern expands/contracts in a period of one rotation of the photoconductor drum.

As shown in FIG. 2, an image forming apparatus of the first embodiment is a multi-image forming apparatus in which four image forming stations Pa, Pb, Pc, Pd are disposed. The respective image forming stations Pa, Pb, Pc, Pd have photoconductor drums (photoconductors) 1a, 1b, 1c, 1d as image carriers.

In peripheries of the photoconductor drums 1a, 1b, 1c, 1d, there are disposed charging means 3a, 3b, 3c, 3d for uniformly charging surfaces of the respective photoconductor drums 1a, 1b, 1c, 1d at a predetermined electric potential, exposure means 4 for irradiating exposure light beams 4K, 4C, 4M, 4Y corresponding to the specific color image data on the charged photoconductor drums 1a, 1b, 1c, 1d and forming electrostatic latent images, developing means 5a, 5b, 5c, 5d for developing the electrostatic latent images formed on the photoconductor drums 1a, 1b, 1c, 1d, transfer means 6a, 6b, 6c, 6d for transferring toner images developed on the photoconductor drums 1a, 1b, 1c, 1d onto an endless intermediate transfer belt (intermediate transfer body) 8, and cleaning means 7a, 7b, 7c, 7d for removing residual toner remaining on the photoconductor drums 1a, 1b, 1c, 1d after the toner image is transferred to the intermediate transfer belt 8 from the photoconductor drums 1a, 1b, 1c, 1d.

Here, the intermediate transfer belt 8 is rotated in a direction of an arrow R in the drawing by a driving roller 9. Additionally, a black image, a cyan image, a magenta image, and a yellow image are formed in the image forming stations Pa, Pb, Pc, Pd, respectively. Moreover, single-color images of respective colors formed on the photoconductor drums 1a, 1b, 1c, 1d are successively superposed and transferred onto the intermediate transfer belt 8 so that a full-color image is formed.

In the image forming apparatus, a driving unit 2 for driving the intermediate transfer belt 8 via the photoconductor drums 1a, 1b, 1c, 1d and the driving roller 9 is disposed.

A sheet supply cassette 12 in which sheet materials 11 such as a printing sheet are stored is disposed under the apparatus. Moreover, the sheet materials 11 are fed out to a sheet conveyance path from the sheet supply cassette 12 one by one.

A sheet material transfer roller 13, brought in contact with an outer peripheral surface of the intermediate transfer belt 8 over a predetermined amount, for transferring the color image formed on the intermediate transfer belt 8 to the sheet material 11, and a fixing unit 14 for fixing the color image transferred onto the sheet material 11 to the sheet material 11 by pressure and heat generated with holding/rotating of rollers are disposed along the sheet conveyance path.

In the multi-image forming apparatus constituted in this manner, a latent image of a black component color in the image information is first formed on the photoconductor drum 1a by the charging means 3a and the exposure means 4 of the image forming station Pa. This latent image is visualized as a black toner image by the developing means 5a having a black toner, and transferred as the black toner image onto the intermediate transfer belt 8 by the transfer means 6a.

On the other hand, while the black toner image is transferred to the intermediate transfer belt 8, a latent image of a cyan component color is formed in the image forming station Pb, and subsequently a cyan toner image of cyan toner is developed by the developing means Sb. Moreover, the cyan toner image is transferred onto the intermediate transfer belt 8 with the black toner image transferred thereto in the previous image forming station Pa by the transfer means 6b of the image forming station Pb, and superposed upon the black toner image.

Subsequently, a magenta toner image, and a yellow toner image are also formed in a similar method. When four-color toner images are completely superposed upon the intermediate transfer belt 8, the four-color toner images are collectively transferred onto the sheet material 11 supplied by a sheet supply roller 10 from the sheet supply cassette 12 by the sheet material transfer roller 13. Moreover, the transferred toner images are heated/fixed onto the sheet material 11 by the fixing unit 14, and a full-color image is formed on the sheet material 11.

Additionally, after the transfer is ended, the residual toner is removed from the respective photoconductor drums 1a, 1b, 1c, 1d by the cleaning means 7a, 7b, 7c, 7d, and the drums are prepared for the next continuously performed image formation.

Driving connection of the driving unit 2 and photoconductor drums 1a, 1b, 1c, 1d according to the first embodiment will next be described.

As shown in FIGS. 3 and 4, an involute spline shaft 18 rotates around a rotation shaft 20, and is connected to an involute spline hole 19 attached onto respective rotation shafts of the photoconductor drums 1a, 1b, 1c, 1d. A driving force transmitted to the involute spline shaft 18 is transmitted to the respective photoconductor drums 1a, 1b, 1c, 1d via the involute spline hole 19, and the photoconductor drums 1a, 1b, 1c, 1d are thereby rotated/driven.

As shown in FIG. 5 in detail, the involute spline shaft 18 and the involute spline hole 19 have a tooth surface of an involute spline. The involute spline hole 19 is inserted in an axial direction with respect to the involute spline shaft 18 and the tooth surface of the involute spline shaft 18 contacts the tooth surface of the involute spline hole 19 on opposite sides (portions A, B) so that the involute spline shaft is connected to the involute spline hole. Moreover, gaps are formed between a tooth tip C of the involute spline shaft 18 and the involute spline hole 19 and between a tooth root D of the involute spline shaft 18 and the involute spline hole 19, respectively.

With such the constitution, looseness in a peripheral direction between the involute spline shaft 18 and involute spline hole 19 is canceled. Therefore, load means such as a conventional torque limitter is unnecessary and a driving load can be reduced, and thus, miniaturization and cost reduction of the driving unit 2 can be realized. Furthermore, when the involute spline shaft 18 and the involute spline hole 19 having such a structure are used, these components are smoothly interconnected with each other without any difficulty.

Additionally, it has been described that the tooth surface of the involute spline shaft 18 and the tooth surface of the involute spline hole 19 contact with each other in the portions A, B and are therefore interconnected with each other. However, it is impossible to bring all teeth into contact, considering from precision of processing/molding of components. Therefore, in actual, a non-contact portion or a engaging state is also generated. However, since there are a large number of the spline teeth, that is, at least ten spline teeth, the teeth function without any problem in an average contact or an average engaging state.

Moreover, because of properties of the involute spline, a rotation center of the involute spline shaft 18 is set to be in alignment with a rotation center of the involute spline hole 19 with good precision. Therefore, an angular speed fluctuation is reduced or canceled, and it is possible to reduce or cancel jitter, density unevenness, and transfer position deviation of an AC component at a low cost under a simple structure.

Reasons for this will be described hereinafter.

First, as shown in FIG. 6, it is considered that there is a looseness E between the involute spline shaft 18 and the involute spline hole 19. As shown in FIG. 7A, with the looseness E, the rotation center of the involute spline hole 19 in the photoconductor drums 1a to 1d deviates upwards by an amount e with respect to the rotation center of the involute spline shaft 18 of the driving unit 2 and is fixed.

In FIGS. 7A, 7B, character F denotes a pitch circle of the involute spline shaft 18 of the driving unit, and G denotes a pitch circle of the involute spline hole 19 of the photoconductor drums 1a to 1d.

As shown in the drawings, the pitch circle of the involute spline hole 19 of the photoconductor drums 1a to 1d becomes eccentric with respect to the rotation center by the amount e. In actual, the pitch circle of the involute spline shaft 18 is also eccentric because of processing precision. However, for convenience of description, it is assumed that there is eccentricity only in the pitch circle of the involute spline hole 19 of the photoconductor drums 1a to 1d.

Here, FIG. 7A shows a state in which the pitch circle G of the involute spline hole 19 of the photoconductor drums 1a to 1d becomes eccentric downwards. In this case, an engagement position between the involute spline shaft 18 and the involute spline hole 19 is on an upper side. Moreover, it is assumed that the involute spline shaft 18 rotates about the rotation center at a constant angular speed $\omega 0$. Then, the involute spline hole 19 rotates at an angular speed $\omega 1$. Here, since a distance between the rotation center of the involute spline hole 19 and the engagement position is reduced, $\omega 1 > \omega 0$ results. Therefore, the involute spline holes 19, that is, the photoconductor drums 1a to 1d rotate at an angular speed higher than that of the involute spline shaft 18.

FIG. 7B shows a state in which the photoconductor drums 1a to 1d rotate by 180° and the pitch circle G of the involute spline hole 19 becomes eccentric upwards. In this case, the engagement position between the involute spline shaft 18 and involute spline hole 19 is on a lower side. Moreover, the involute spline shaft 18 similarly rotates at the constant angular speed ω0, but the involute spline hole 19 rotates at the angular speed ω2. Here, since the distance between the rotation center of the involute spline hole 19 and the engagement position is enlarged, ω2<ω0 results. Therefore, the involute spline holes 19, that is, the photoconductor drums 1a to 1d rotate at an angular speed slower than that of the involute spline shaft 18.

It is seen from the above that the distance between the rotation center of the involute spline hole 19 in the photoconductor drums 1a to 1d and the engagement position fluctuates in one rotation period, and accordingly the angular speed fluctuates in one rotation period of the photoconductor drums 1a to 1d as shown in FIG. 7C.

Here, since a writing start position of the latent image in the photoconductor drums 1a to 1d is remote from a transfer position of the toner image onto the transfer belt, the pitch is assumed to fluctuate in one rotation period of the photoconductor drums 1a to 1d, for example, with a formed ladder pattern. The ladder pattern indicates a time fluctuation required for the rotation of the photoconductor drum from a writing position of the laser beam to the transfer position. Concretely, the writing start position of the latent image is remote from the transfer position onto the intermediate transfer belt 8 by 180°. The latent image is assumed to be written when the photoconductor drums 1a to 1d rotate at a high angular speed. Then, the angular speed of the photoconductor drums 1a to 1d gets late in the transfer position. Therefore, a transfer time is lengthened, and a pitch of the ladder pattern expands. Conversely, when the angular speed of the photoconductor drums 1a to 1d is in a slow state, and the latent image starts to be written, the pitch contracts. That is, as shown in FIG. 10, a position deviation of an AC component is caused such that the pitch of the ladder pattern expands/contracts in a movement direction R of the intermediate transfer belt in one rotation period of the photoconductor drums 1a to 1d. This also means that the jitter and the density unevenness are generated in one rotation period of the photoconductor drums 1a to 1d.

It has been described above that the rotation center of the involute spline hole 19 in the photoconductor drums 1a to 1d deviates upwards with respect to the rotation center of the involute spline shaft 18 of the driving unit and is fixed. However, similar phenomenon occurs even with deviation in any direction.

On the other hand, in the present embodiment, as shown in FIG. 5, the involute spline shaft 18 and the involute spline hole 19 have the tooth surface of the involute spline. The involute spline hole 19 is attached to the involute spline shaft 18 in the axial direction and the tooth surface of the involute spline shaft 18 contacts the tooth surface of the involute spline hole 19 on opposite sides (portions A, B) so that the involute spline shaft is connected to the hole. Moreover, the gaps are formed between the tooth tip C of the involute spline shaft 18 and the involute spline hole 19 and between the tooth root D of the involute spline shaft 18 and the involute spline hole 19. Thus, when the involute spline hole 19 is positioned by the involute spline shaft 18 of the driving unit, the involute spline shaft 18 and the involute spline hole 19 are integrally structured with each other, and there is no looseness in the peripheral and radius directions. Therefore, even when the pitch circle of the involute spline hole 19 in the photoconductor drums 1a to 1d is eccentric, as shown in FIGS. 8A and 8B, the rotation center of the involute spline shaft 18 is aligned with the rotation center of the involute spline hole 19 attached to the photoconductor drums 1a to 1d. A rotation angle of the involute spline shaft 18 therefore always coincides with a rotation angle of the involute spline hole 19, and no angular speed fluctuation is generated in a connection portion as shown in FIG. 8C. The position deviation of the AC component in one rotation period of the photoconductor drums 1a to 1d as shown in FIGS. 6 and 7 is not generated.

That is, the jitter and the density unevenness in one rotation period of the photoconductor drums 1a to 1d are not generated. Moreover, since the images on a plurality of photoconductor drums 1a to 1d are transferred onto the same position of the intermediate transfer belt 8, color deviation is not generated.

Furthermore, in the involute spline shaft 18, a step H is formed in the axial direction as shown in FIG. 9, and the radius of the involute spline at a tip end in the axial direction, i.e., on the involute spline hole side, may be smaller than that at a root portion in the axial direction, i.e., on the driving unit.

Thereby, a gap J in the radius direction is formed between the tip end in the axial direction of the involute spline shaft 18 and the involute spline hole 19. With the structure, during insertion the involute spline shaft 18 and the involute spline hole 19 do not engage with each other. The involute spline hole 19 can smoothly be attached to the involute spline shaft 18 without any difficulty. This can facilitate an assembly operation and component change operation.

Second Embodiment

Figure 11:
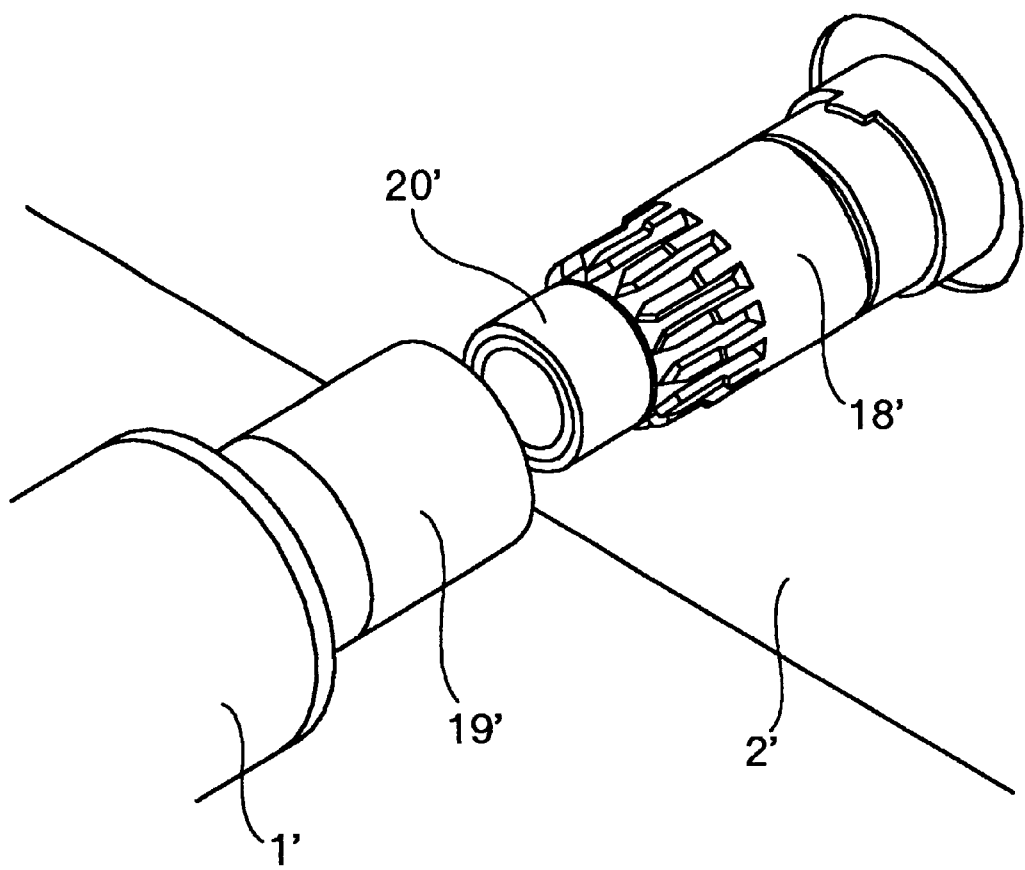
FIG. 11 is a perspective view showing a main part of the driving unit and the photoconductor drum in the image forming apparatus according to a second embodiment of the present invention.
Figure 12:
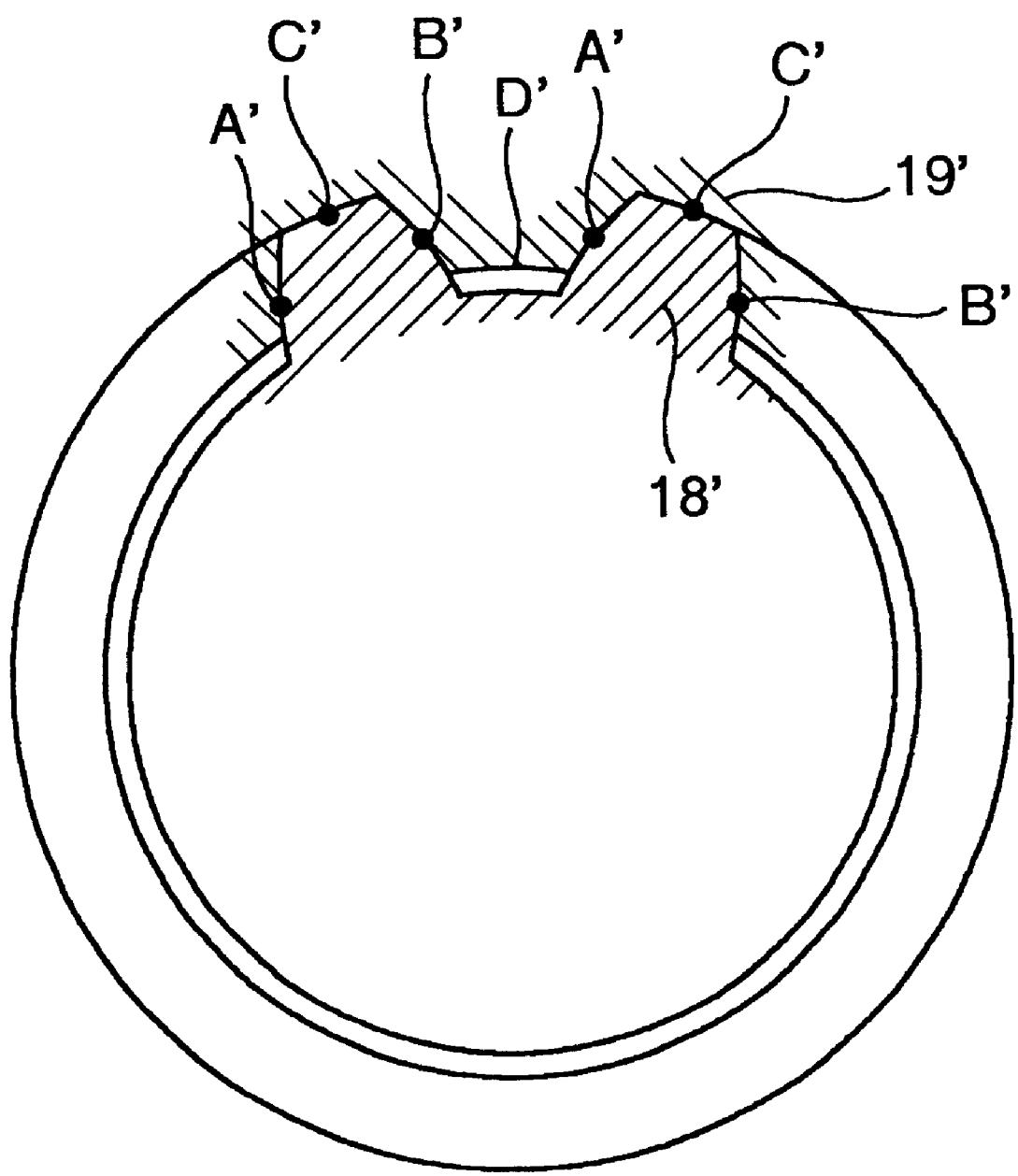
FIG. 12 is a sectional view showing the engagement state of the driving spline and the follower spline in FIG. 11.

FIG. 11 is a perspective view showing a main part of a driving unit and photoconductor drum in an image forming apparatus according to a second embodiment of the present invention, FIG. 12 is a sectional view showing an engagement state of a driving spline and a follower spline in FIG. 11, FIG. 13 is an explanatory view showing transmission of an angular speed between the driving spline and the follower spline according to the second embodiment of the present invention, and FIG. 14 is a perspective view showing a tooth shape of the driving spline.

The second embodiment is different from the first embodiment only in a shape of an involute spline shaft 18' and a connection state between the involute spline shaft 18' and the involute spline hole 19'. Only these parts will be described with reference to the drawings.

As shown in FIG. 11, the involute spline shaft 18' rotates around a rotation shaft 20', and is connected to the involute spline hole 19' attached onto the rotation shafts of photoconductor drums 1a', 1b', 1c', 1d'. The driving force transmitted to the involute spline shaft 18' is transmitted to the photoconductor drums 1a', 1b', 1c', 1d' via the involute spline hole 19', and the photoconductor drums 1a', 1b', 1c', 1d' are thereby rotated/driven.

As shown in FIG. 12 in detail, the involute spline shaft 18' and the involute spline hole 19' have tooth surfaces of the involute spline. The involute spline hole 19' is attached in the axial direction to the involute spline shaft 18' and the tooth surface of the involute spline shaft 18' contacts the tooth surface of the involute spline hole 19' on opposite sides (portions A', B'). Furthermore, a tooth tip C' of the involute spline shaft 18' also contacts the involute spline hole 19' so that the involute spline shaft is connected to the involute spline hole. Moreover, a gap is formed between a tooth root D' of the involute spline shaft 18' and the involute spline hole 19'.

With such the constitution, the looseness in the peripheral and radius directions between the involute spline shaft 18' and the involute spline hole 19' is canceled. Therefore, the load means such as the conventional torque limitter is abolished, the driving load can be reduced, and miniaturization and cost reduction of a driving unit 2' can be realized. Furthermore, when the involute spline shaft 18' and the involute spline hole 19' are used, these components are smoothly interconnected with each other without any difficulty.

Additionally, it has been described that the tooth surface of the involute spline shaft 18' and the tooth surface of the involute spline hole 19' contact each other in the portions A', B' and the tooth tip C' of the involute spline shaft 18' contacts with the involute spline hole 19' such that the involute spline shaft to the involute spline hole interconnect each other. However, it is impossible to bring all the teeth into contact in view of the precision of processing/molding of the components. Therefore, in actual, the non-contact portion or the engaging state is also generated. However, since there are a large number of the spline teeth, that is, at least ten spline teeth, the teeth function without any problem in the average contact or engaging state.

Figure 13A:
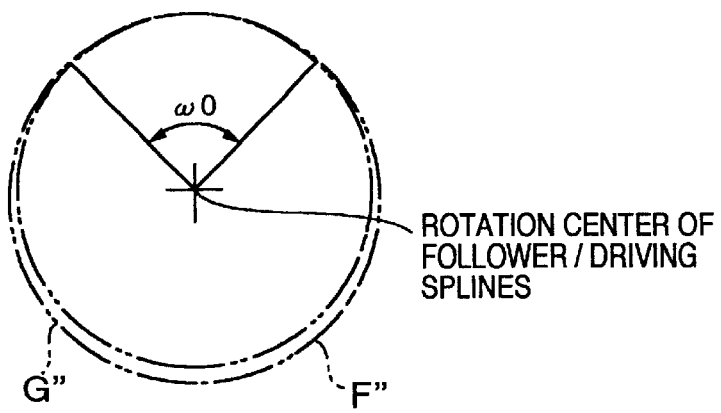
FIGS. 13A to 13C are explanatory views showing transmission of the angular speed by the driving spline and the follower spline according to the second embodiment of the present invention.
Figure 13B:
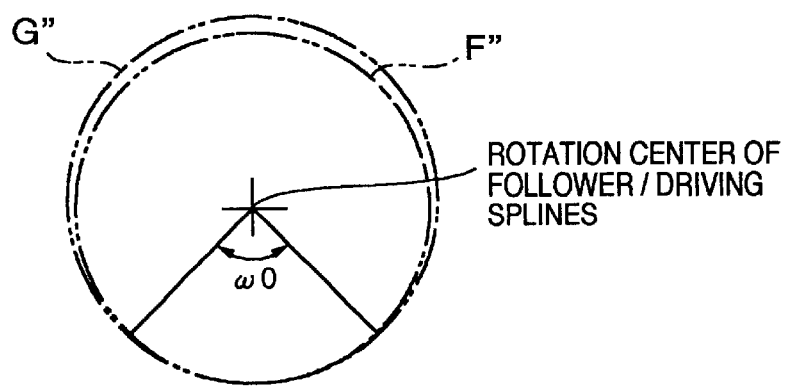
Figure 13C:
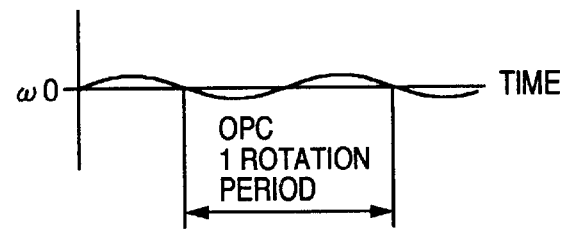

Moreover, as shown in FIGS. 13A to 13C, because of the properties of the involute spline, the rotation center of the involute spline shaft 18' is set to be in alignment with the rotation center of the involute spline hole 19' with good precision. Therefore, the angular speed fluctuation is reduced or canceled, and it is possible to reduce or cancel jitter, density unevenness and transfer position deviation in the AC component at the low cost under the simple structure. Moreover, since the images on the plurality of photoconductor drums 1a' to 1d' are transferred onto the same position of the intermediate transfer belt 8, the color deviation is not generated. Incidentally, the reasons for this are described above in the first embodiment.

A color deviation reduction effect in a sub scanning direction has been described above. However, there is also an effect that color deviation in a main scanning direction can also be reduced. Reasons for this will briefly be described.

As described above, since the involute splines contact each other by the tooth surfaces and are interconnected with each other as described in the embodiment of the present invention, vibration in the axial direction of the photoconductor drum can be canceled.

Therefore, in a conventional example, the photoconductor drum moves in the axial direction, and the color deviation is generated in the main scanning direction. On the contrary, in the embodiment of the present invention, since the photoconductor drum does not move in the axial direction, the color deviation in the main scanning direction can effectively also be reduced.

Figure 14A:
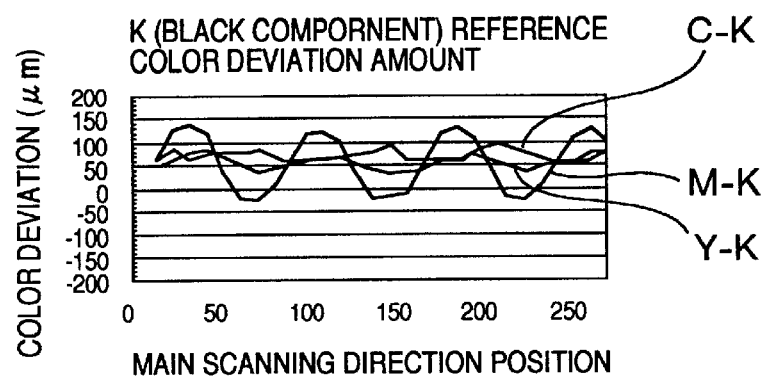
FIGS. 14A, 14B are diagrams showing a color deviation amount of the conventional image forming apparatus and the image forming apparatus according to the embodiment of the present invention, respectively.
Figure 14B:
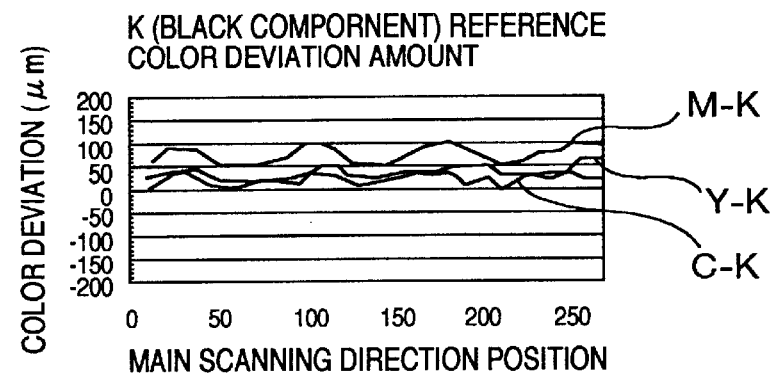

Here, experiment results of measurement of a color deviation amount are shown in FIGS. 14A, 14B. This shows a color deviation reduction effect in the main scanning direction by reduction of the drum vibration in the axial direction. FIG. 14A shows the color deviation amount in the main scanning direction in the conventional image forming apparatus, and FIG. 14B shows the color deviation amount in the main scanning direction in the image forming apparatus according to the present embodiment. As shown in the drawings, a black component (K) is used as a reference, color deviation amounts of the reference from other cyan component (C), magenta component (M), yellow component (Y) are measured, and a smaller amplitude indicates less color deviation.

Figure 15A:
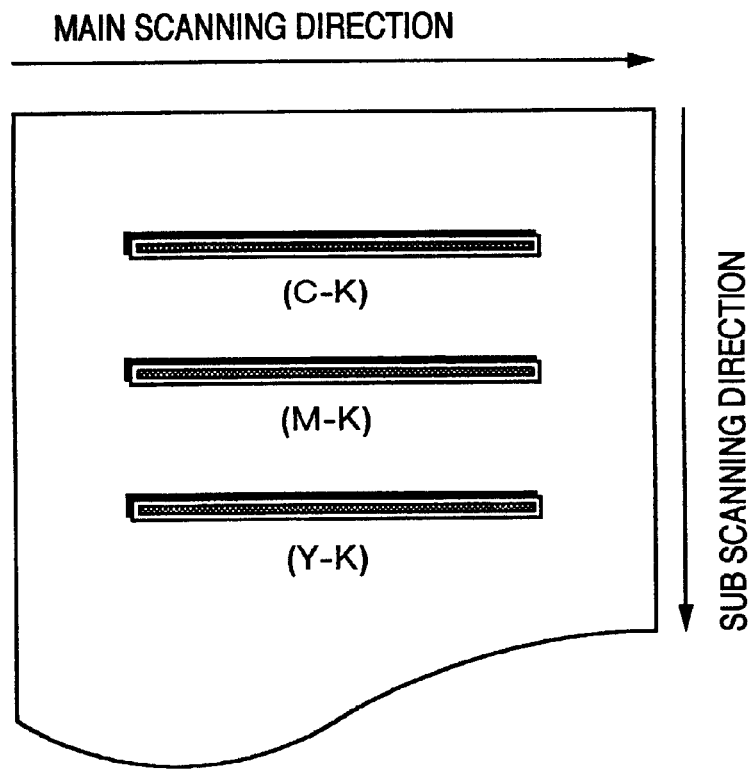
FIGS. 15A, 15B are diagrams showing color deviation of a main scanning direction of the conventional image forming apparatus and the image forming apparatus according to the embodiment of the present invention in detail, respectively.
Figure 15B:
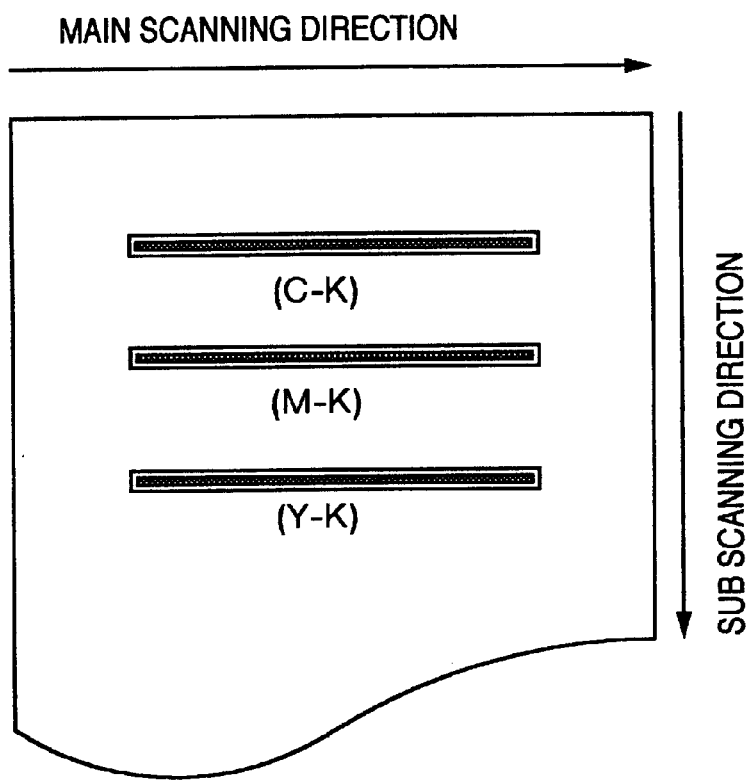

This respect will be described in further detail. As shown in FIGS. 15A, 15B, the black component is used as the reference, and the color deviations of the other color components C, M, Y are generated in the conventional example of FIG. 15A. However, in the present embodiment of FIG. 15B, the color deviation shown in FIG. 15A is not caused.

Figure 16:
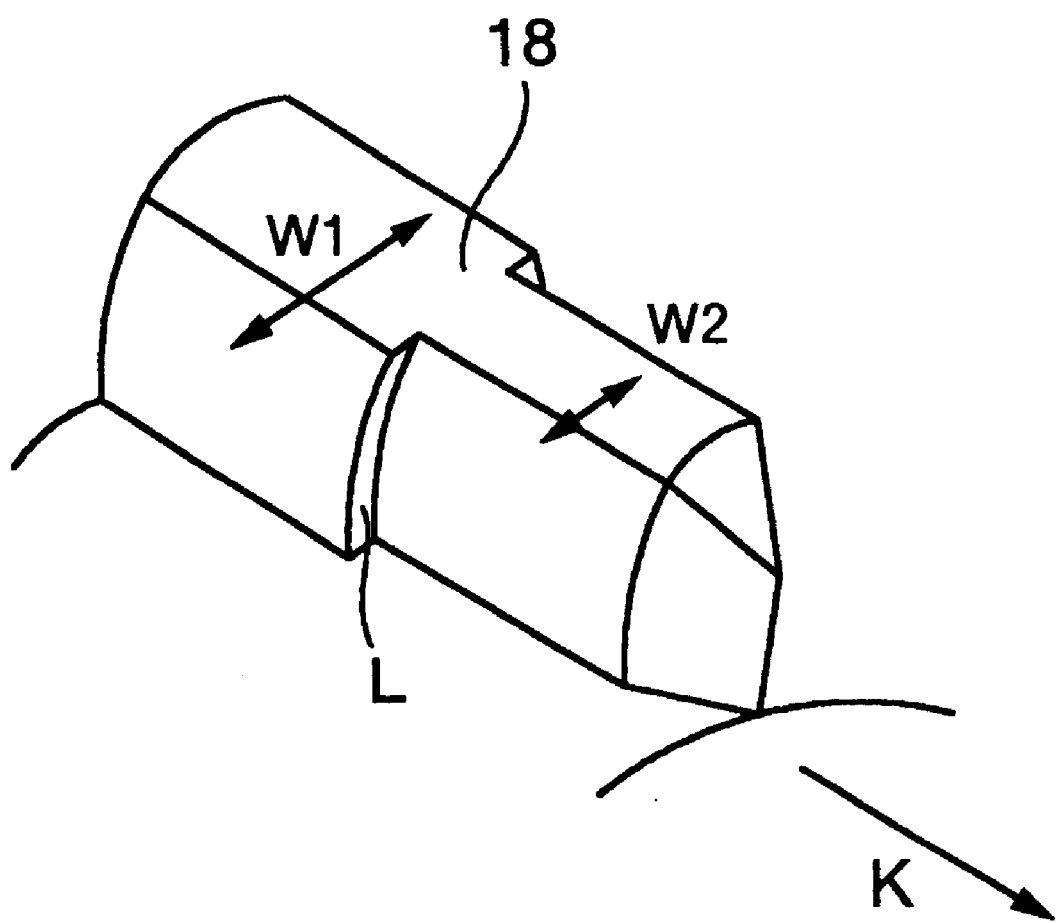
FIG. 16 is a perspective view showing a tooth shape of the driving spline according to the second embodiment of the present invention.

Moreover, as shown in FIG. 16, the involute spline shaft 18 is inserted in a direction of an arrow K into the involute spline hole 19. Moreover, a step L is formed in the axial direction, and a tooth-width at a tip end in the axial direction, i.e., on the involute spline hole 19, may be smaller than that at the root portion in the axial direction, i.e., on the driving unit (W2<W1). Thereby, the gap in the tooth-width direction is formed between the tip end in the axial direction of the involute spline shaft 18 and the involute spline hole 19. Therefore, during insertion, the involute spline shaft 18 and the involute spline hole 19 do not engage with each other, and the involute spline hole 19 can smoothly be attached to the involute spline shaft 18 without any difficulty, so that the assembly operation and component change operation can be facilitated.

Figure 17:
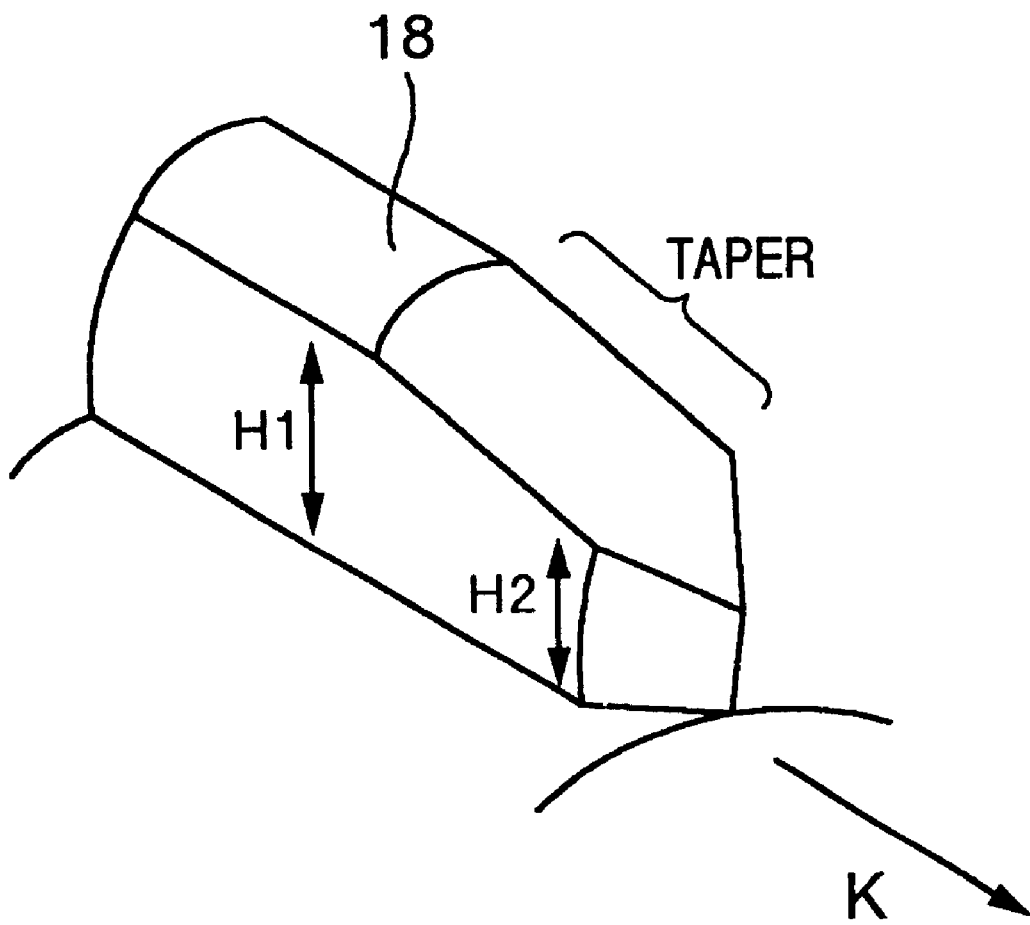
FIG. 17 is a perspective view showing the tooth shape of the driving spline according to a modification example of the second embodiment of the present invention.

FIG. 17 is a perspective view showing the tooth shape of the driving spline according to a modification example of the present invention.

The modification example is different from the first or second embodiment only in the shape of the involute spline shaft 18 and the connection state between the involute spline shaft 18 and involute spline hole 19. Only these parts will be described with reference to the drawing.

As shown in FIG. 17, the involute spline shaft 18 is inserted in the direction of the arrow K into the involute spline hole 19. Moreover, a taper is formed from a predetermined position in the axial direction, and a tooth dimension (radius) at the tip end in the axial direction is smaller than that at the root portion (H2<H1). Thereby, the gap in the radius direction is formed between the tip end in the axial direction of the involute spline shaft 18 and the involute spline hole 19. Therefore, during insertion, the involute spline shaft 18 and the involute spline hole 19 do not engage with each other, and the involute spline hole 19 can smoothly be attached to the involute spline shaft 18 without any difficulty, so that the assembly operation and component change operation can be facilitated.

Additionally, the taper may start from a position at the root portion in the axial direction. In this case, a tooth dimension taper is formed on the entire tooth shape of the involute spline shaft 18, but a similar effect can be obtained.

Figure 18:
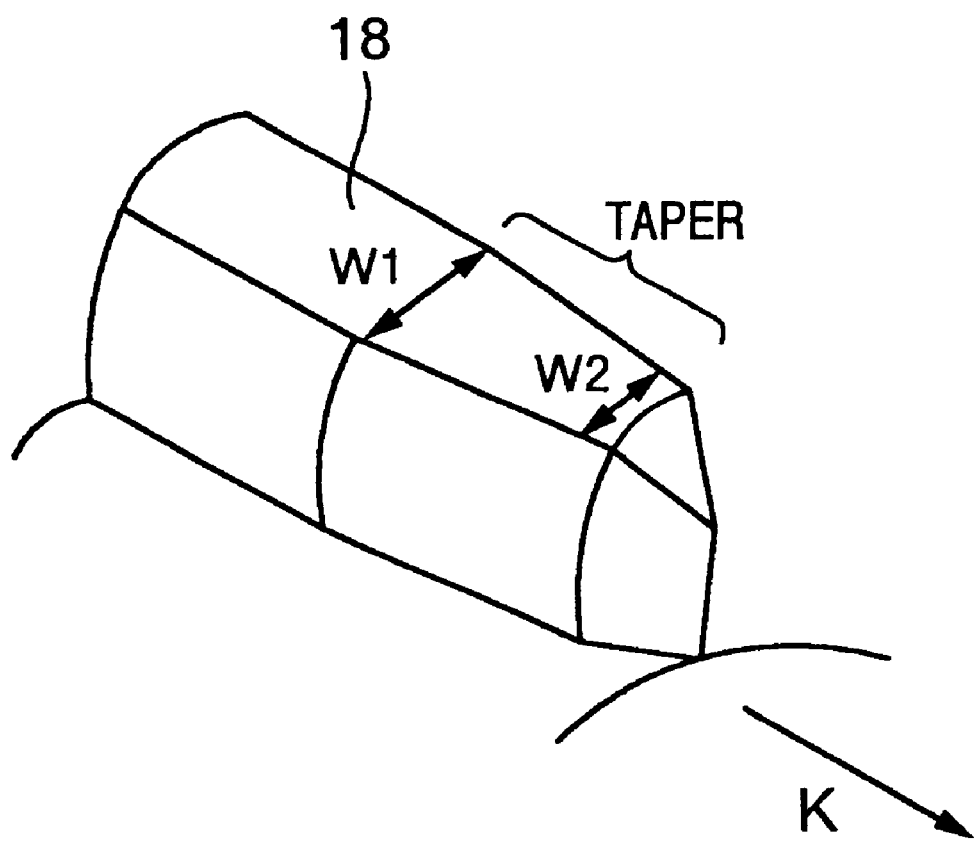
FIG. 18 is a perspective view showing the tooth shape of the driving spline according to another modification example of the second embodiment.

FIG. 18 is a perspective view showing the tooth shape of the driving spline according to another modification example of the present invention.

The modification example is different from the first or second embodiment or the aforementioned modification example only in the shape of the involute spline shaft 18 and the connection state between the involute spline shaft 18 and involute spline hole 19. Only these parts will be described with reference to the drawing.

As shown in FIG. 18, the involute spline shaft 18 is inserted in the direction of the arrow K into the involute spline hole 19. Moreover, the taper is formed from the predetermined position in the axial direction, and a tooth width at the tip end in the axial direction, i.e., on the involute spline hole side, is smaller than that at the root portion, i.e., on the driving unit side (W2<W1). Thereby, the gap in the tooth-width direction is formed between the tip end in the axial direction of the involute spline shaft 18 and the involute spline hole 19. Therefore, during insertion, the involute spline shaft 18 and involute spline hole 19 do not engage with each other, and the involute spline hole 19 can smoothly be attached to the involute spline shaft 18 without any difficulty, so that the assembly operation and component change operation can be facilitated.

Additionally, the taper may start from the position at the root portion in the axial direction. In this case, the taper in the tooth-width direction is formed on the entire tooth shape of the involute spline shaft 18, but the similar effect can be obtained.

Moreover, in the above description, the multi-image forming apparatus of the tandem system using the intermediate transfer belt has been described. However, the present invention can also be applied to a multi-image forming apparatus of the tandem system in which the image is directly transferred to a sheet from the photoconductor drum, a multi-image forming apparatus of the tandem system in which a photoconductor belt is used instead of the photoconductor drum, a multi-image forming apparatus in which a transfer body is rotated a plurality of times and the images are superposed, and a single-color image forming apparatus.

Therefore, the driving load can be reduced, and the miniaturization and cost reduction of the driving system can be achieved in various image forming apparatuses.

Furthermore, a high-quality image can be formed in which the jitter, density unevenness, and transfer position deviations such as a pitch deviation during formation of the ladder pattern are reduced or canceled.

Third Embodiment

A third embodiment according to the present invention will next be described with reference to FIGS. 19 to 25. Additionally, the same member is denoted with the same reference numeral in these drawings, and redundant description is omitted.

Figure 19:
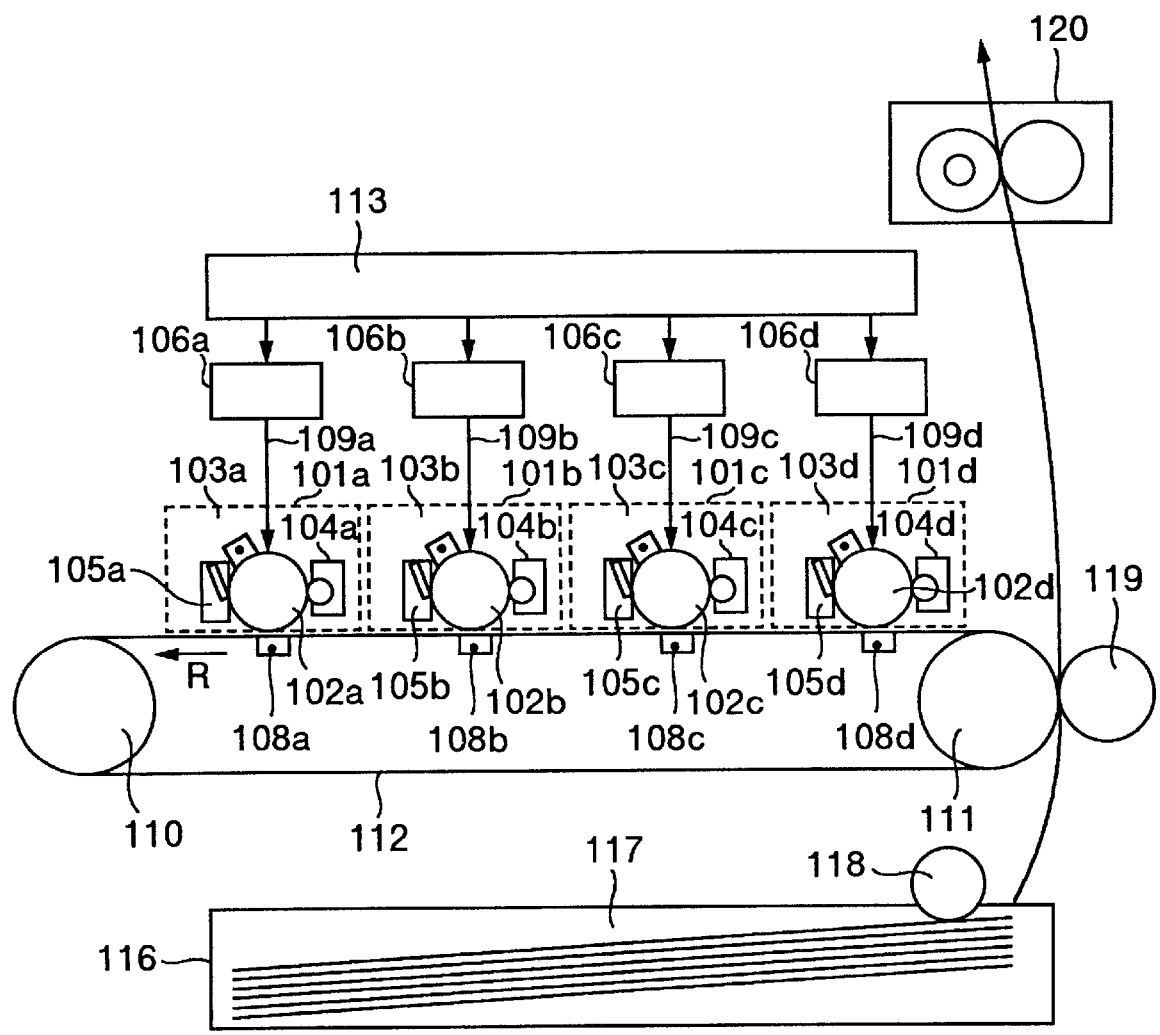
FIG. 19 is a schematic diagram showing a constitution of a color image forming apparatus according to a third embodiment of the present invention.
Figure 20:
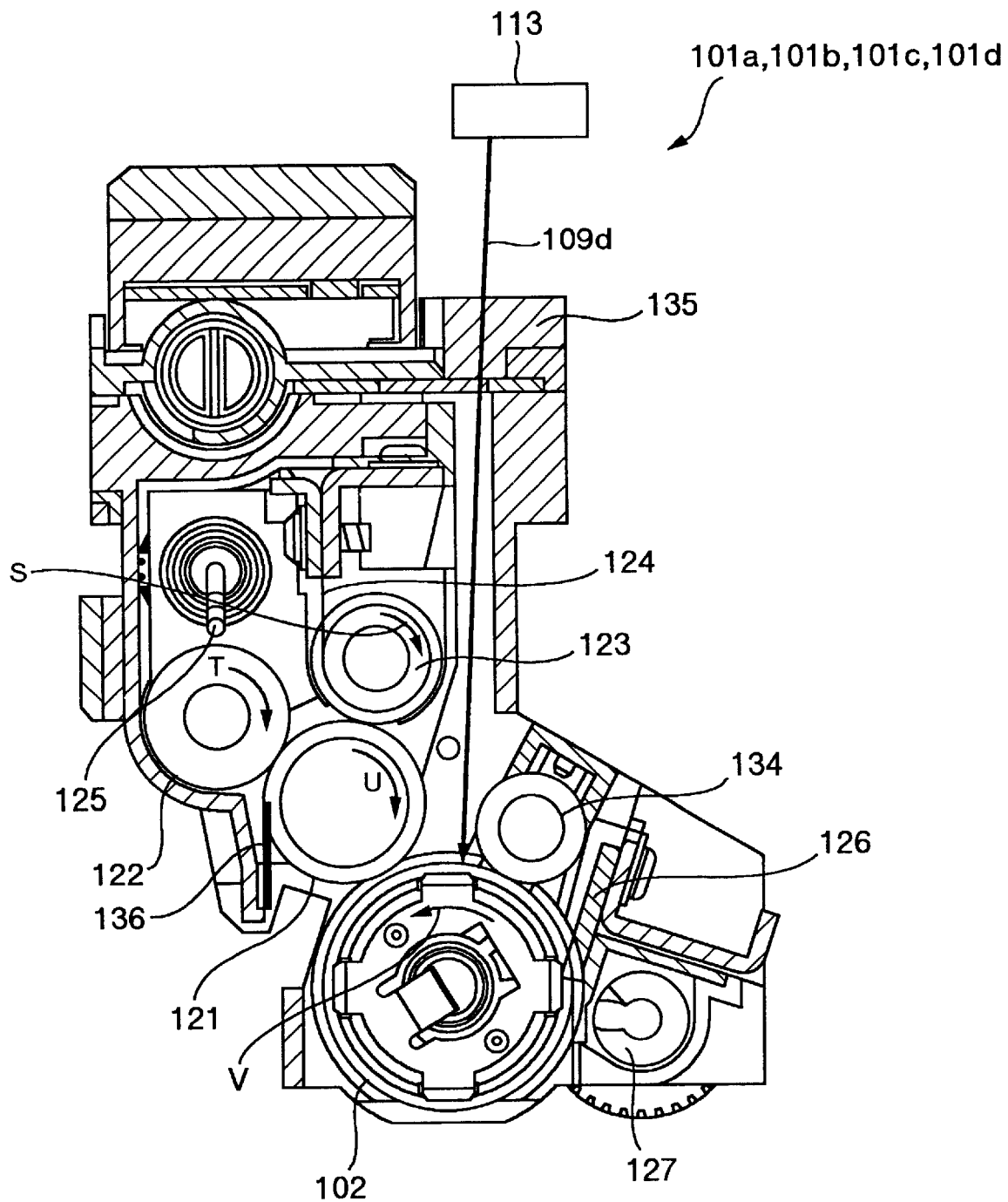
FIG. 20 is a sectional view showing an image forming station in the color image forming apparatus of FIG. 19 in detail.
Figure 21:
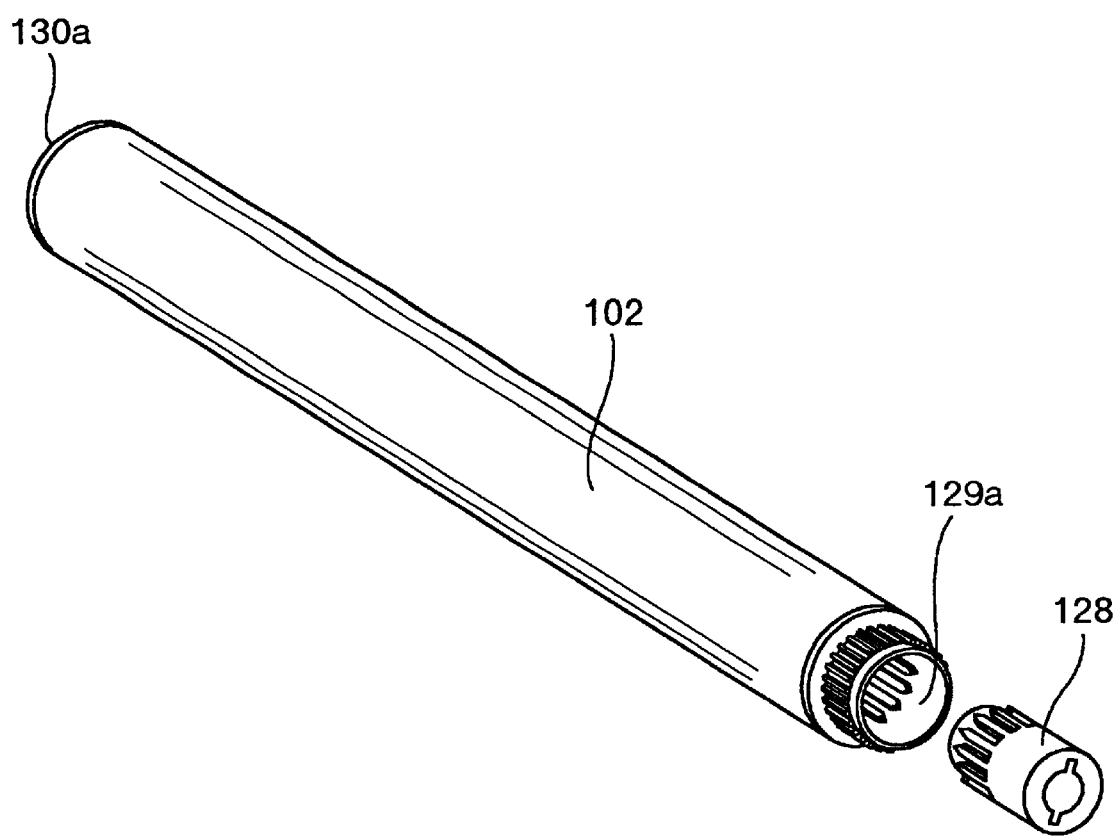
FIGS. 21 to 24 are diagrams showing a part of the image forming apparatus in FIG. 19.
Figure 22:
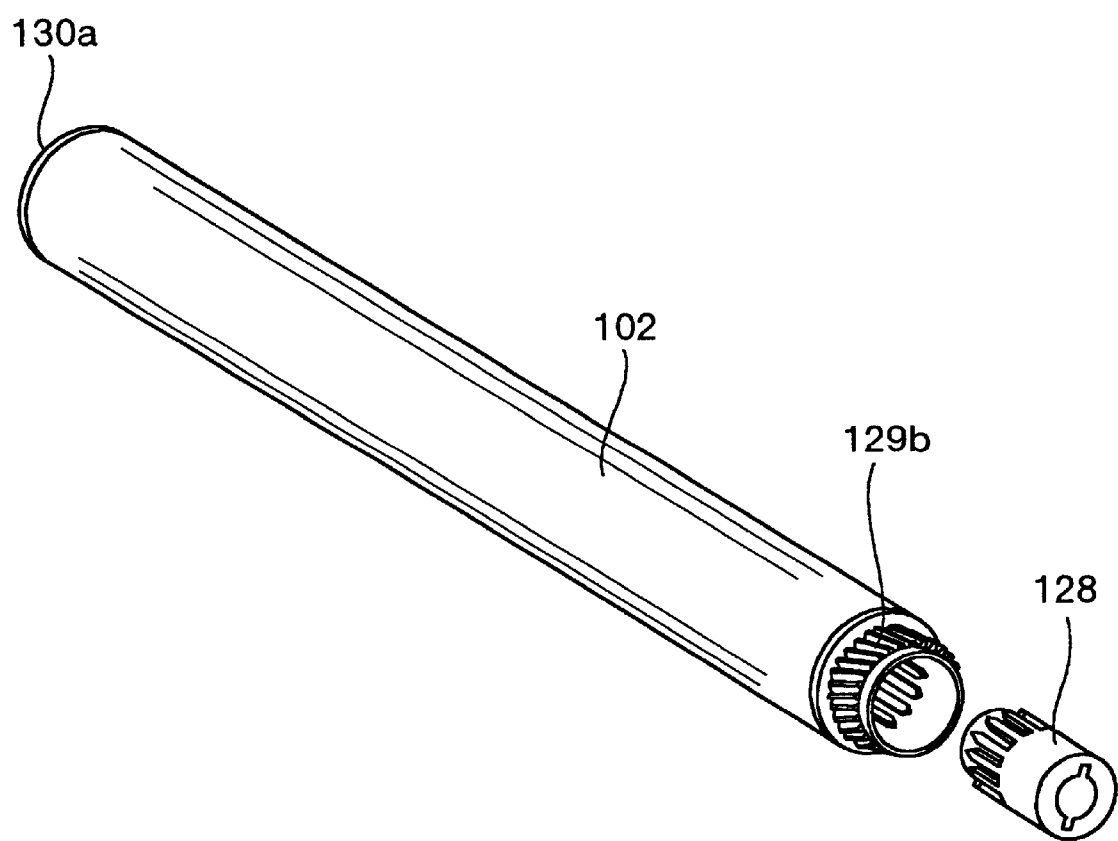
Figure 23:
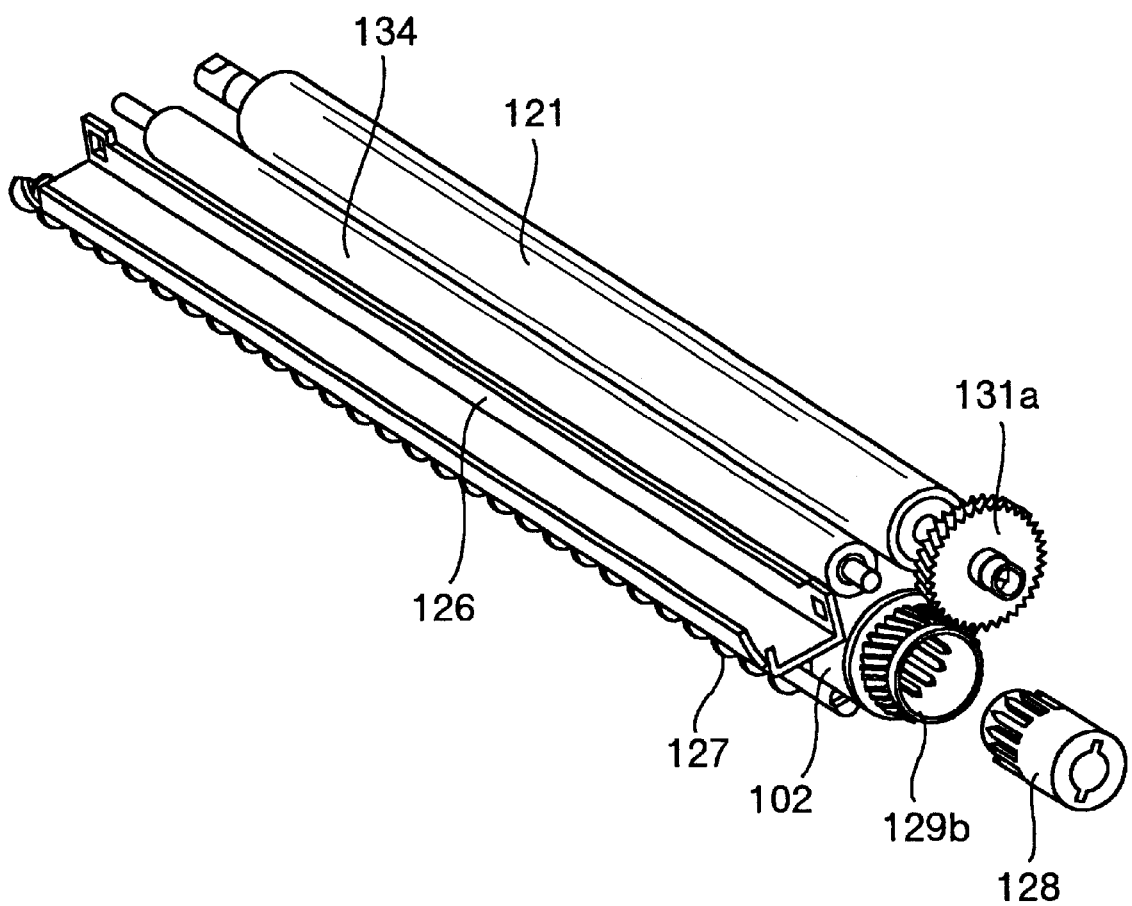
Figure 24:
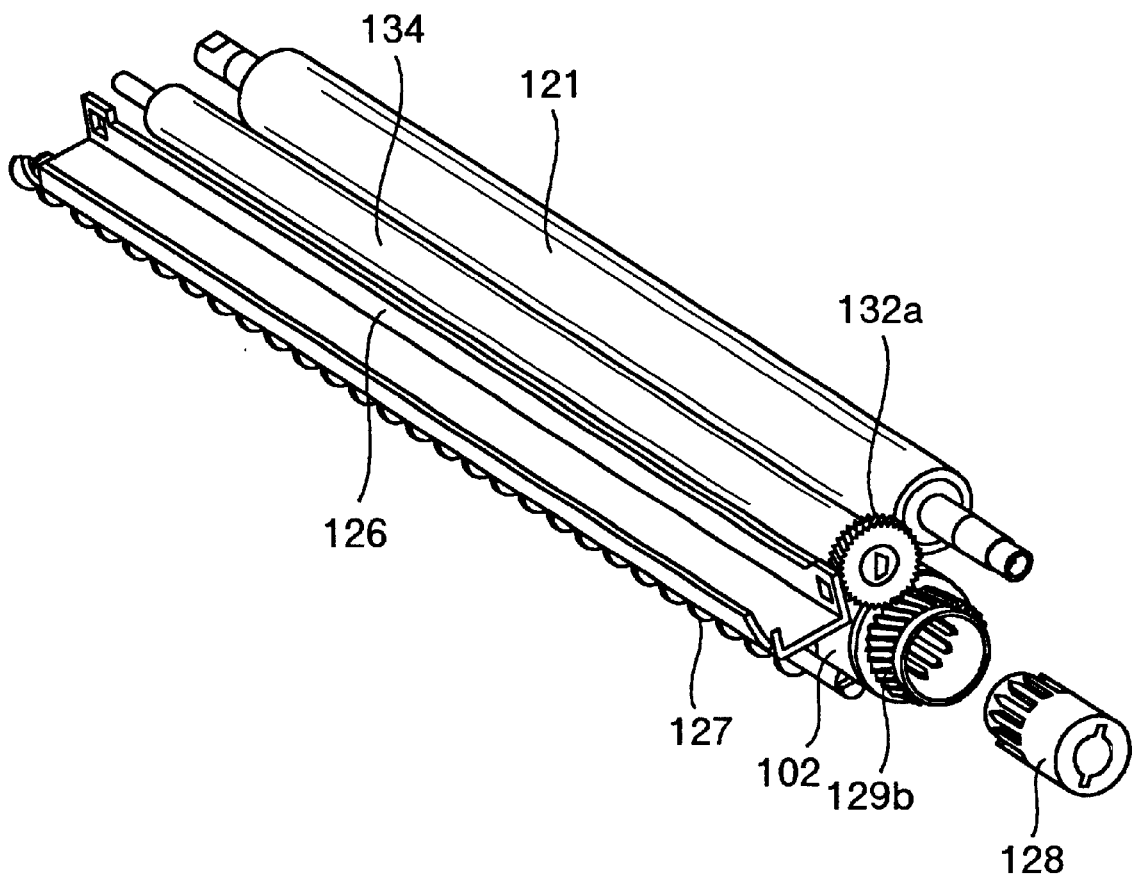
Figure 25:
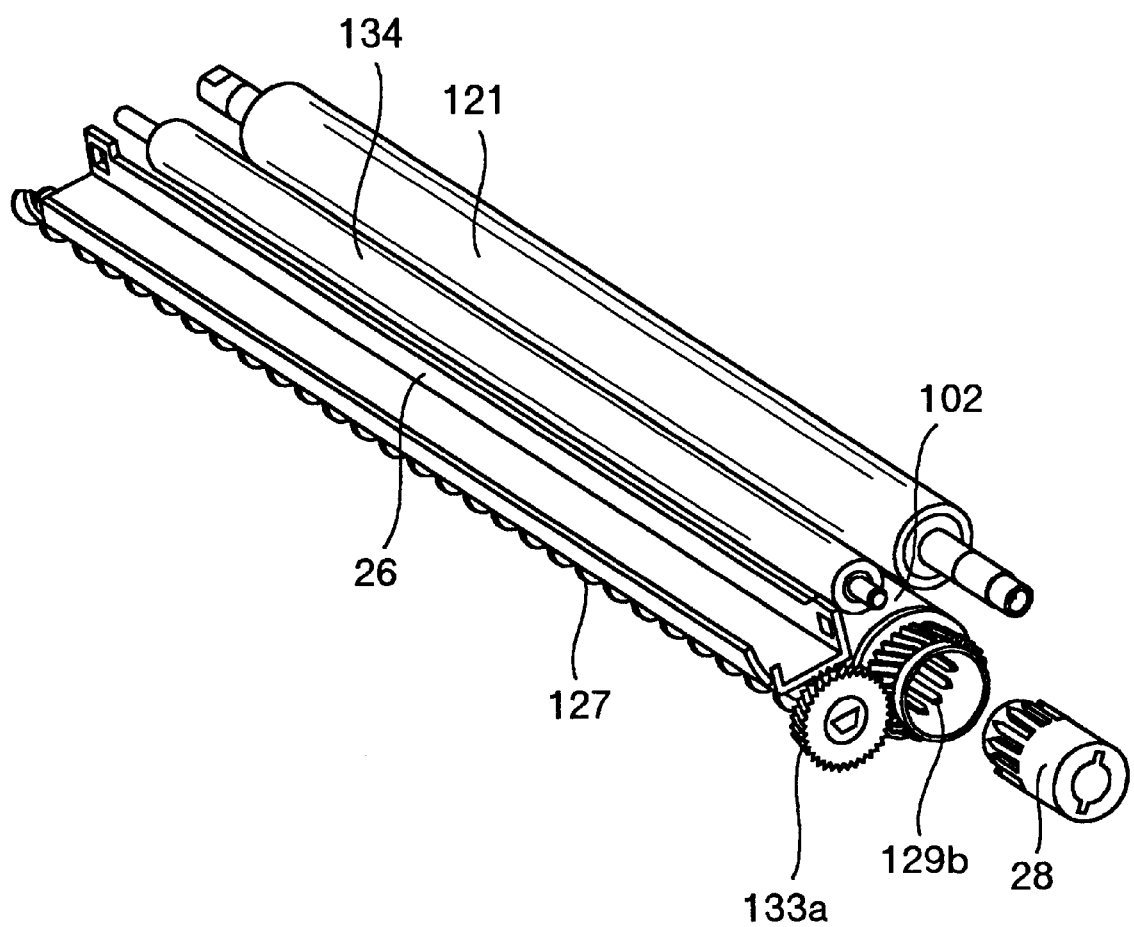
FIG. 25 is a diagram showing a part of the image forming apparatus of FIG. 19 in detail.
Figure 26:
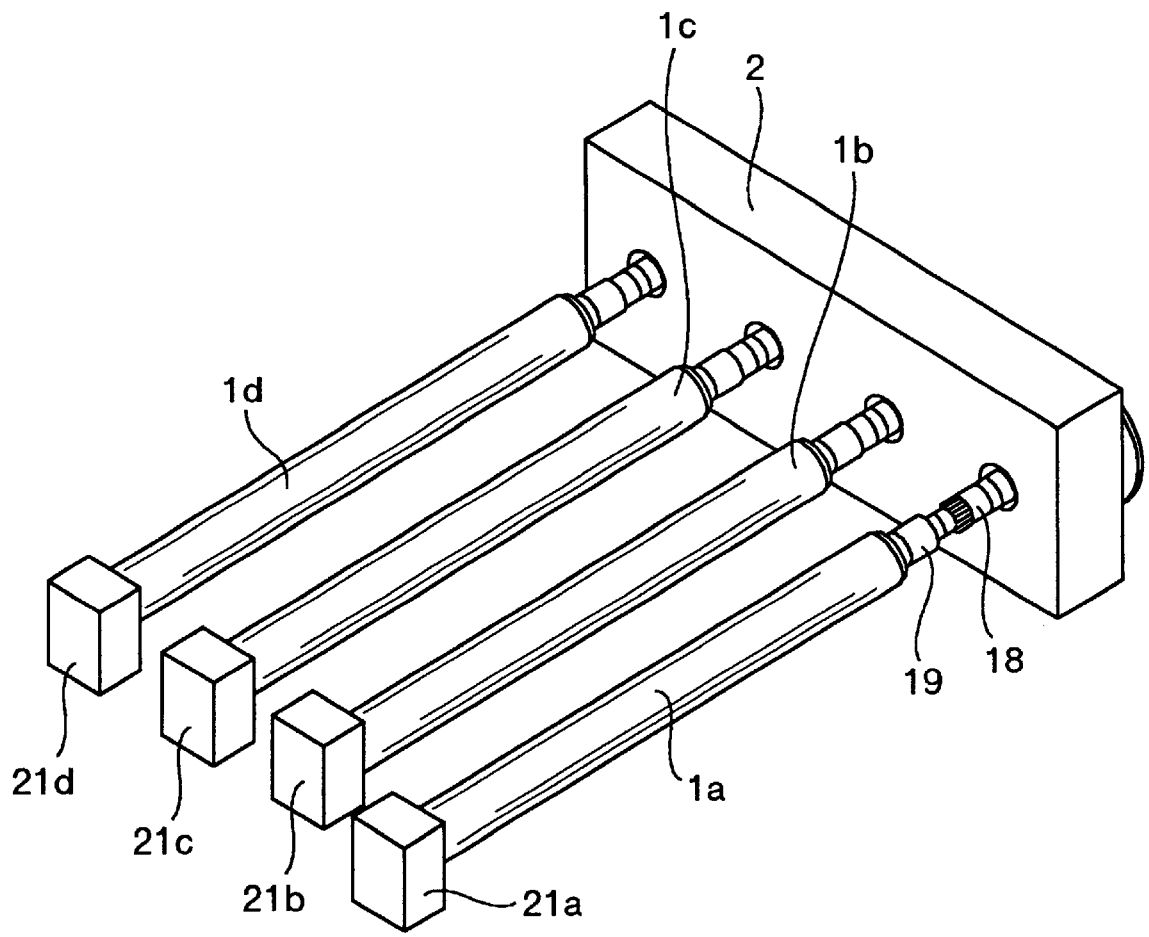
FIG. 26 is a perspective view showing a driving unit and a photoconductor drum of a conventional image forming apparatus.
Figure 27:
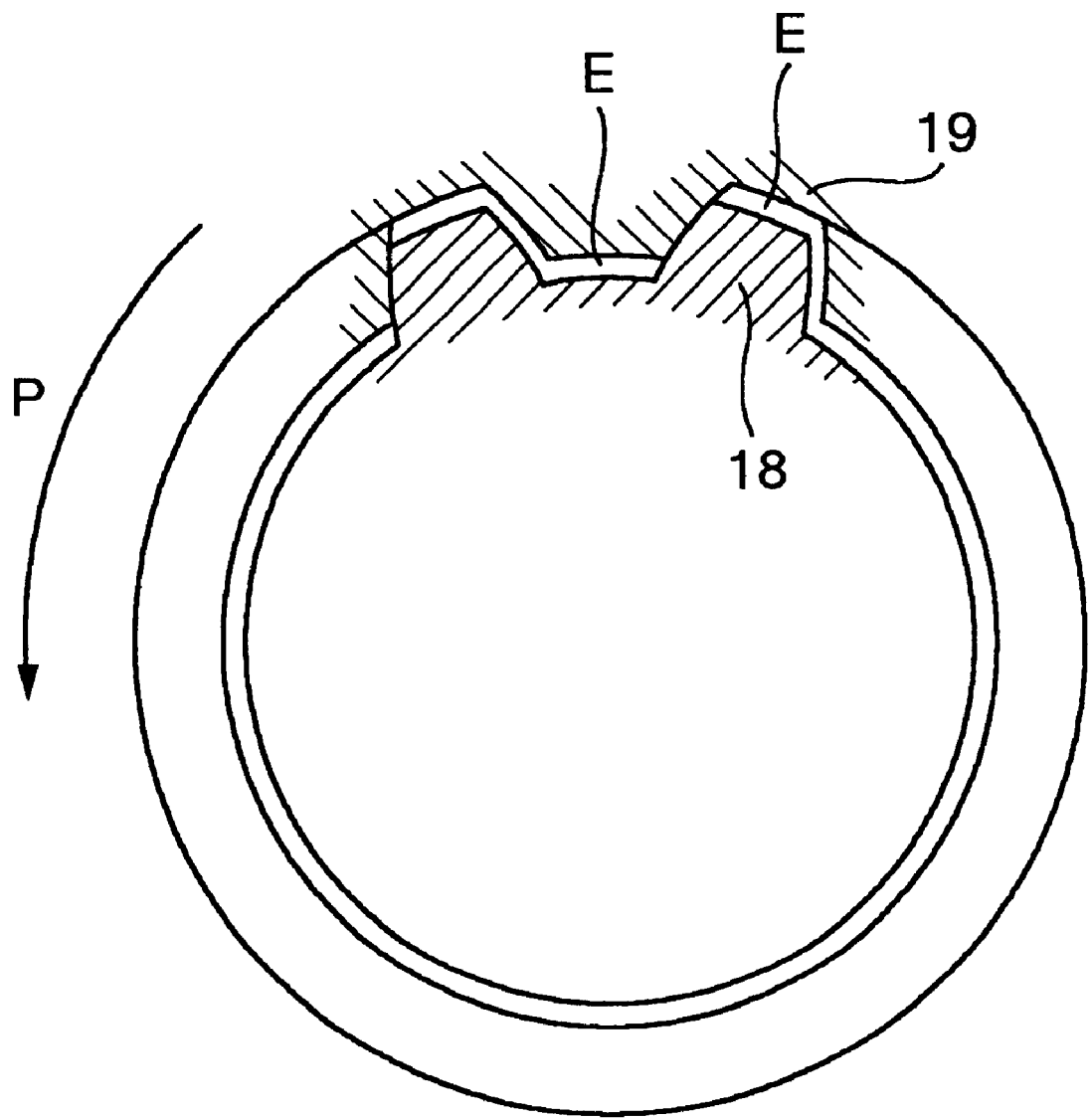
FIG. 27 is en explanatory view showing the engagement state of the driving spline and the follower spline in FIG. 26.
Figure 28:
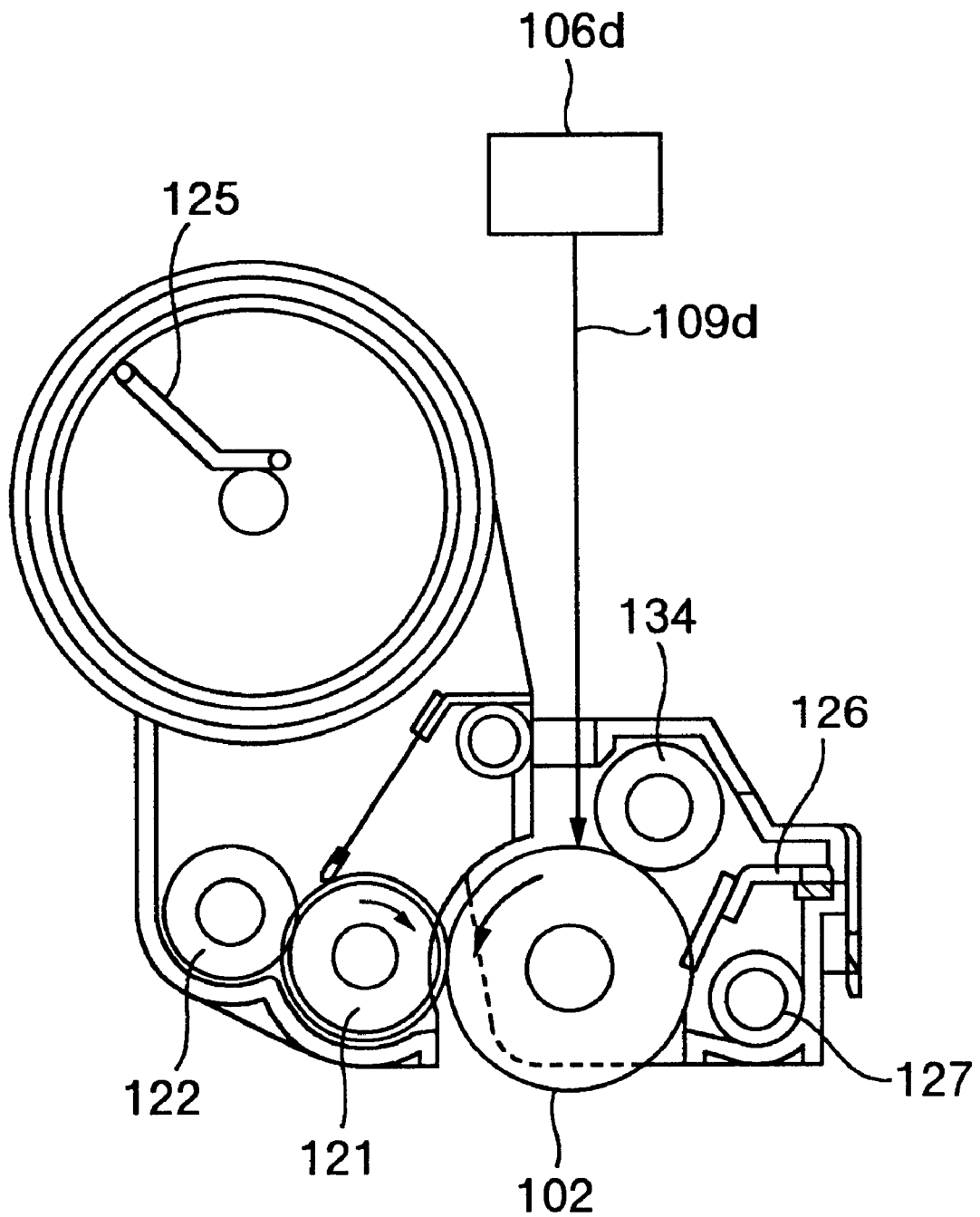
FIG. 28 is a sectional view showing an image forming unit of another conventional image forming apparatus.
Figure 29:
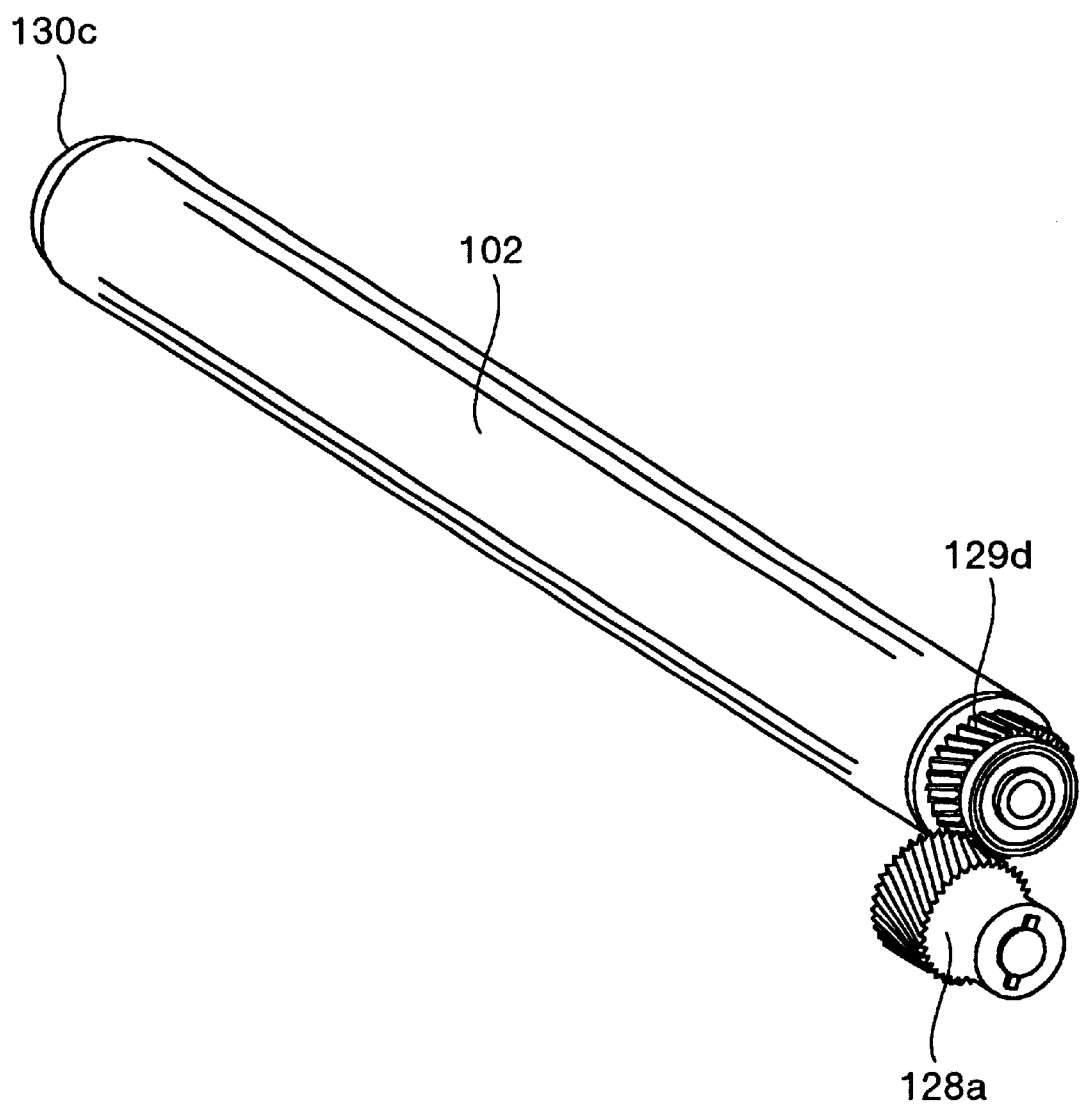
FIGS. 29 to 33 are perspective views showing a part of the image forming apparatus in FIG. 28 in detail.
Figure 30:
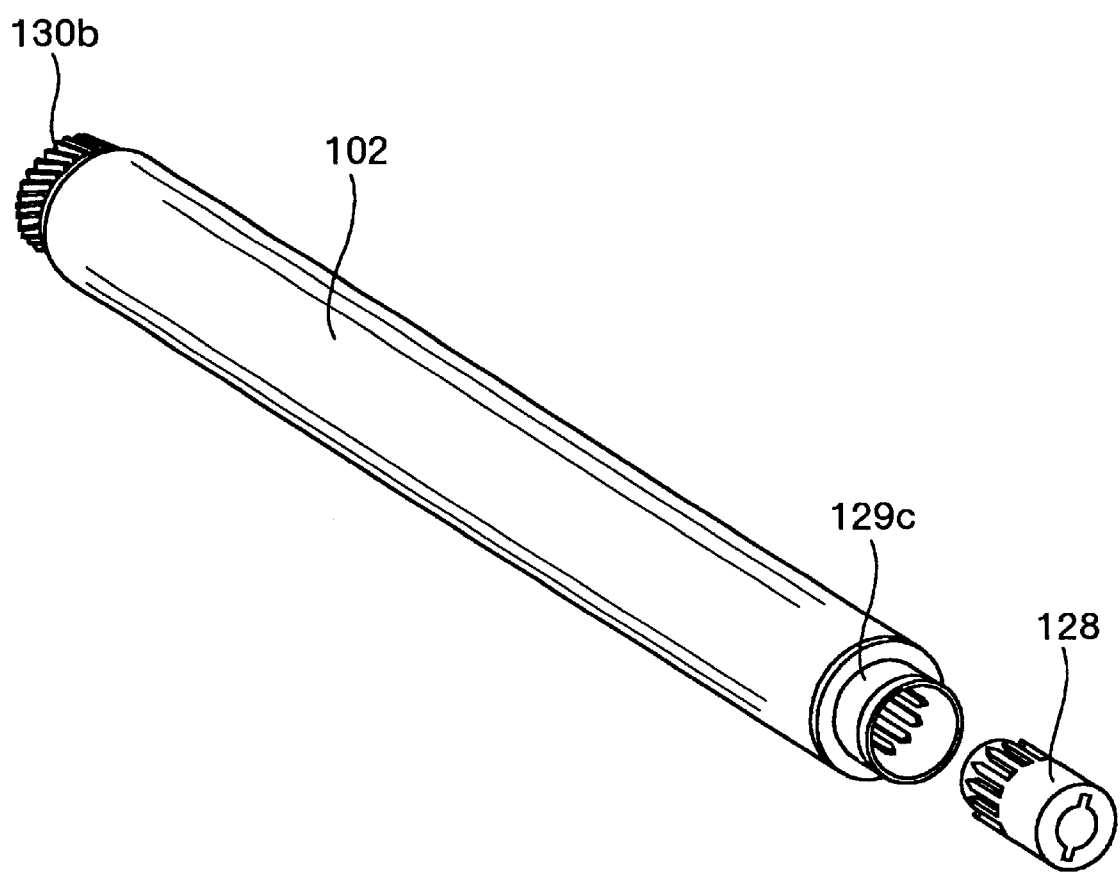
Figure 31:
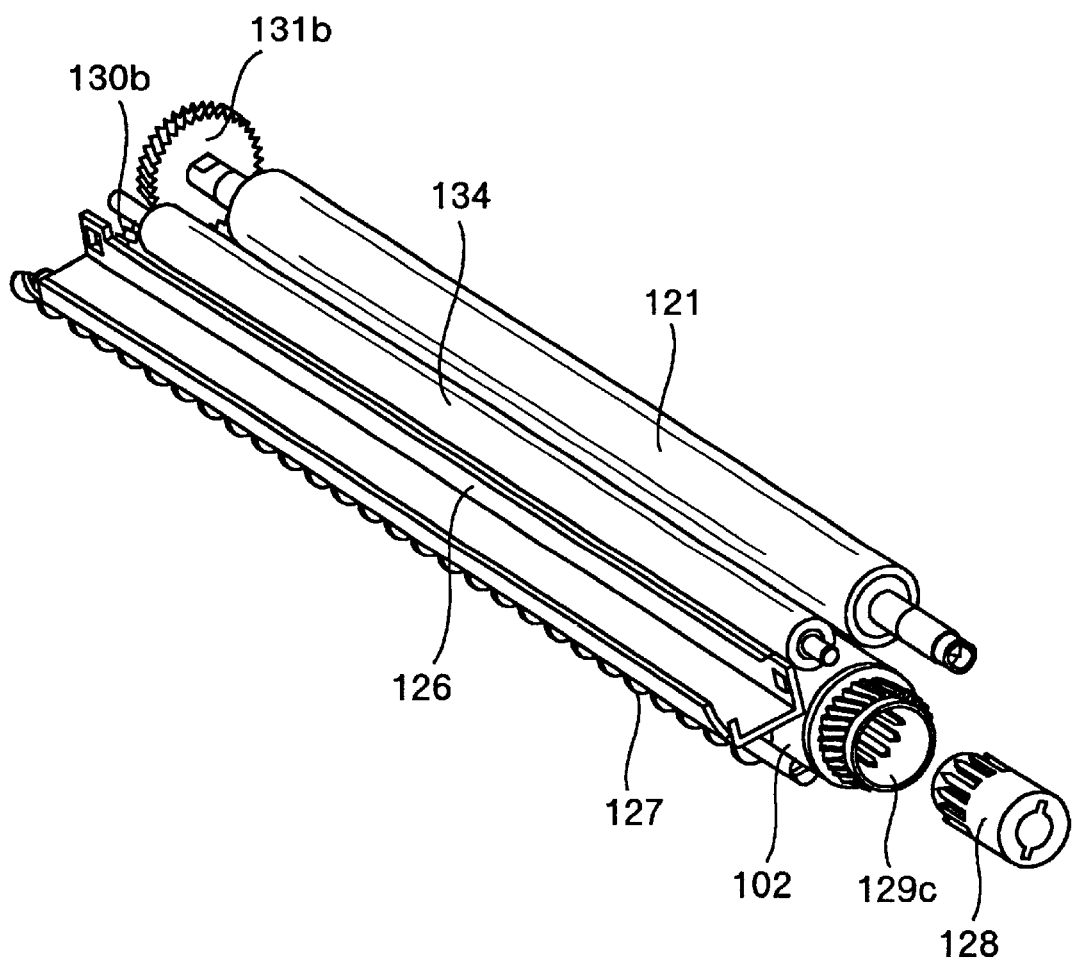
Figure 32:
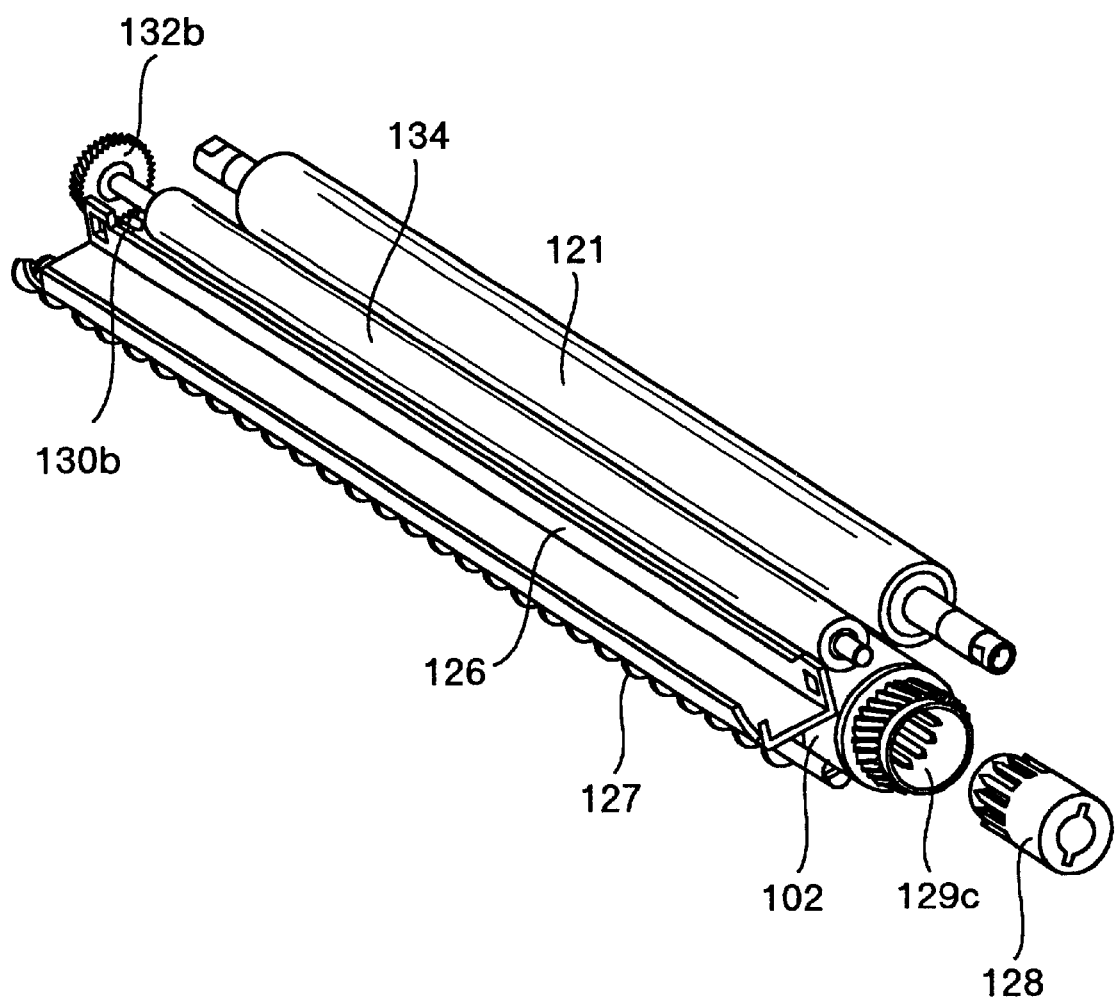
Figure 33:
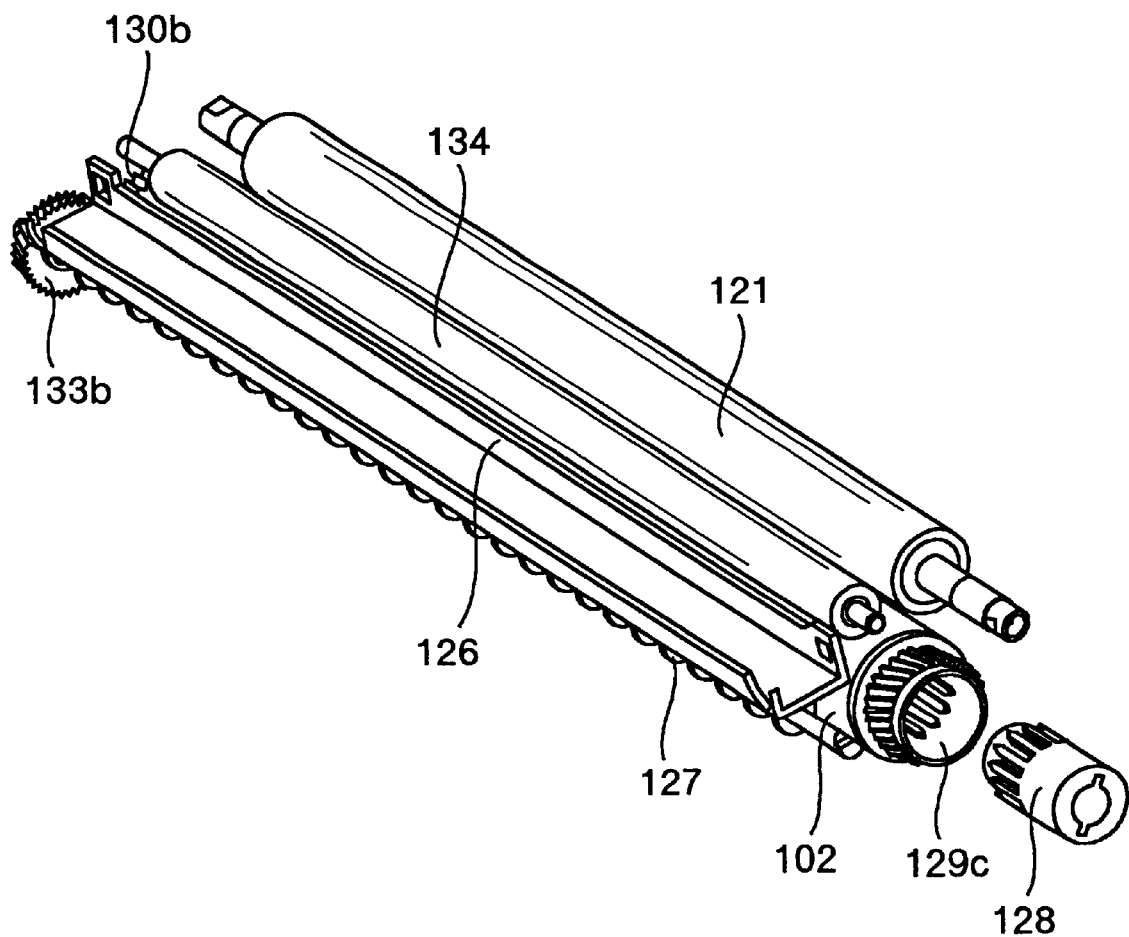

FIG. 19 is a schematic diagram showing a constitution of a color image forming apparatus according to the third embodiment of the present invention, FIG. 20 is a sectional view showing an image forming station in the color image forming apparatus of FIG. 19 in detail, FIG. 21 is a perspective view showing a part of the color image forming apparatus of FIG. 19 in detail, FIG. 22 is a perspective view showing a modification example of a part of the color image forming apparatus of FIG. 19 in detail, FIG. 23 is a perspective view showing a part of the color image forming apparatus of FIG. 19 in detail, FIG. 24 is a perspective view showing a part of the color image forming apparatus of FIG. 19 in detail, and FIG. 25 is a perspective view showing a part of the color image forming apparatus of FIG. 19 in detail.

As shown in FIG. 19, in the image forming apparatus according to the third embodiment, four image forming stations 101*a*, 101*b*, 101*c*, 101*d* are disposed. Moreover, the respective image forming stations 101*a*, 101*b*, 101*c*, 101*d* have photoconductor drums (photoconductors) 102*a*, 102*b*, 102*c*, 102*d* as the image carriers. In the vicinity of the photoconductor drums, as at least one member to be driven, charging means 103*a*, 103*b*, 103*c*, 103*d* for uniformly charging the surfaces of the respective photoconductor drums 102*a*, 102*b*, 102*c*, 102*d*, developing means 104*a*, 104*b*, 104*c*, 104*d* for developing the electrostatic latent images, cleaning means 105*a*, 105*b*, 105*c*, 105*d* for removing the residual toner, exposure means 106*a*, 106*b*, 106*c*, 106*d* of a scanning optical system for irradiating the respective photoconductor drums 102*a*, 102*b*, 102*c*, 102*d* with light in accordance with image information, and transfer means 108*a*, 108*b*, 108*c*, 108*d* for transferring the toner images onto an intermediate transfer belt (transfer material) 112 are disposed, respectively.

Here, the yellow image, the magenta image, the cyan image, and the black image are formed in the image forming stations 101*a*, 101*b*, 101*c*, 101*d*, respectively. Moreover, the exposure means 106*a*, 106*b*, 106*c*, 106*d* output exposure lights 109*a*, 109*b*, 109*c*, 109*d* corresponding to the yellow image, the magenta image, the cyan image, and the black image.

An endless belt shaped intermediate transfer belt 112 passed through the respective image forming stations 101*a*, 101*b*, 101*c*, 101*d* and supported by rollers 110, 111 is disposed under the photoconductor drums 102*a*, 102*b*, 102*c*, 102*d*, and peripherally rotates in a direction of an arrow R.

Moreover, a sheet material 117 stored in a sheet supply cassette 116 is supplied by a sheet supply roller 118, and is discharged to the sheet discharge tray 1003 of FIG. 1 via a sheet material transfer roller 119 and fixing means 120.

With respect to the color image forming apparatus constituted as described above, first in the image forming station 101*d*, the latent image of the black component color as the image information is formed on the photoconductor drum 102*d* by known electrophotographic process means using the charging means 103*d* and the exposure means 106*d*. Thereafter, the black toner image is visualized with a developer having the black toner by the developing means 104*d*, and the black toner image is transferred to the intermediate transfer belt 112 by the transfer means 108*d*.

On the other hand, while the black toner image is transferred to the intermediate transfer belt 112, the latent image of the cyan component color is formed in the image forming station 101*c*, and the cyan toner image by the cyan toner is visualized by the developing means 104*c*, transferred by the transfer means 108*c*, and superposed upon the black toner image previously transferred onto the intermediate transfer belt 112.

Subsequently, the magenta toner image, and the yellow toner image are also similarly formed. When superposing of the four-color toner images upon the intermediate transfer belt 112 finishes, the four-color toner images are collectively transferred onto the sheet material 117 such as a paper or the like, taken out by the sheet supply roller 118 of FIG. 19 from the sheet supply cassette 116, by the sheet material transfer roller 119. Moreover, the images are heated/fixed by the fixing means 120, and the full-color image is formed on the sheet material 117.

Additionally, after the transfer finishes, the residual toner is removed from the respective photoconductor drums 102*a*, 102*b*, 102*c*, 102*d* by the cleaning means 105*a*, 105*b*, 105*c*, 105*d*, the drums are prepared for the next continuously performed image formation, and a printing operation is completed.

FIG. 20 is a sectional view showing details of the image forming stations 101*a*, 101*b*, 101*c*, 101*d*.

As shown in FIG. 20, to a casing 135 of the image forming stations (hereinafter referred to as "process units") 101*a*, 101*b*, 101*c*, 101*d*, a photoconductor drum 102 with the electrostatic latent image formed thereon, charging means 134 for uniformly charging the surface of the photoconductor drum 102, developing roller 121 for supplying the toner to the photoconductor drum 102 and developing the electrostatic latent image, toner supply roller 122, press-fitted in parallel to a rotation shaft of the developing roller 121, for supplying the toner to the developing roller 121, agitator 125 for agitating the toner, and a layer thinning roller 123 for thinning a layer of toner attached to the developing roller 121 are rotatably attached. Moreover, a scraper 124 for scraping the toner from the surface of the layer thinning roller 123 is attached via a support member.

Moreover, cleaning means 126 for cleaning an outer peripheral surface of the photoconductor drum 102, and a disposal toner carrying screw 127 for carrying the toner scraped by the cleaning means 126 to a disposal toner box (not shown) are attached to the casing 135.

Furthermore, the charging means 134 for uniformly charging the photoconductor drum 102 is rotatably attached to the casing 135.

Here, the developing roller 121, toner supply roller 122, and layer thinning roller 123 rotate in the same directions S, T, U, respectively, and the photoconductor drum 102 rotates in an opposite direction V.

Additionally, a shaft distance between the developing roller 121 and the toner supply roller 122 is smaller than a sum of radii of the developing roller 121 and toner supply roller 122. Thus, a press-contact amount herein is set to be of the order of 0.3 to 1.5 mm.

The developing roller 121 is formed by integrally forming elastic materials such as silicon rubber and polyurethane rubber with conductivity imparted thereto by adding carbon onto an outer periphery of a metal shaft in about 0.5 to 4.0 mm. A volume resistivity of the roller is designed to be of the order of 102 Ωcm to 107 Ωcm. Moreover, the toner supply roller 122 is formed by integrally forming urethane foam or the like onto the outer periphery of the metal shaft. The layer thinning roller 123 is a metal shaft whose surface roughness is set to be Ra=0.3 μm or less by applying an Ni plating to the surface thereof in order to uniformly reduce a toner layer thickness.

The agitator 125 rotates and agitates the toner so that blocking of the toner is prevented and the toner is carried to the toner supply roller 122.

The toner supply roller 122 rotates with a relative speed difference from the developing roller 121 so that the toner is attached onto the developing roller 121 in a contact portion with the developing roller 121 and the residual toner is scraped from the surface of the developing roller 121 after end of developing. Additionally, the scraped toner is mixed with an unused toner in the casing 135 and reused. The toner supplied to the developing roller 121 by the toner supply roller 122 has a layer thickness regulated on the developing roller 121 by the layer thinning roller 123, and is charged at the same polarity as that of the electrostatic latent image. Moreover, a bias is applied to the layer thinning roller 123 by a voltage application device (not shown) in order to further charge the toner. Subsequently, the charged toner contacts the rotating photoconductor drum 102, and is absorbed by electrification of the electrostatic latent image formed on the photoconductor drum 102 by a writing device 113 by a bias potential applied to the developing roller 121 by a bias voltage application device (not shown), and the image is developed. Additionally, after the development finishing, the residual toner is absorbed again by the casing 135 and mixed with a new toner as described above.

Here, a contact pressure between the developing roller 121 and the layer thinning roller 123 needs to be 10 gf/mm2 or less. This is because a necessary rotation load torque of the developing roller exceeding 3.5 kgfcm results in an excessively large torque.

In the developing roller 121, a sheet material 136 which uniformly abuts on the developing roller 121 in a longitudinal direction of the roller and prevents leakage of the toner is disposed on a downstream side from a developing region of the photoconductor drum 102 and on an upstream side of a rotation direction from a press-contact position with the toner supply roller 122. The sheet material 136 is formed, for example, of urethane rubber, pet film, or the like.

The charging means 134 is formed by integrally forming conductive rubber or attaching a conductive brush to the metal shaft, and is pressed against the photoconductor drum 102, and rotatably attached to the casing 135.

The cleaning means 126 is formed by integrally attaching a blade of urethane rubber to a sheet metal support member via a double-stick tape or an adhesive, and attached to the casing 135 via a small screw or the like in order to scrape the residual toner off the photoconductor drum 102. The toner scraped by the cleaning means 126 drops into a chamber inside the casing 135, and is carried and stored into the disposal toner box (not shown) by the disposal toner carrying screw 127.

As shown in FIG. 21, an involute spline shape to which the driving force is transmitted via a driving pulley 128 from the driving unit is formed on an inner peripheral surface of a driving-side flange 129a press-fitted coaxially with the rotation shaft of the photoconductor drum 102 in an end of the photoconductor drum 102, and a spur gear shape is formed on an outer peripheral surface of the driving-side flange 129a.

Alternatively, as shown in FIG. 22, an involute spline shape for receiving a driving force transmitted via the driving pulley 128 is formed on the inner peripheral surface of a driving-side flange 129b press-fitted coaxially with the rotation shaft of the photoconductor drum 102 in the end of the photoconductor drum 102, and a helical gear shape is formed on the outer peripheral surface of the driving-side flange 129b.

Furthermore, as shown in FIG. 23, according to the helical gear shape formed on the outer peripheral surface of the driving-side flange 129b press-fitted coaxially with the rotation shaft of the photoconductor drum 102 in the end of the photoconductor drum 102 of FIG. 22, the driving force is transmitted to the developing roller 121 via a developing roller gear 131a which meshes with the helical gear shape and which is disposed coaxially with the rotation shaft of the developing roller (member to be driven) 121.

Additionally, as shown in FIG. 24, according to the helical gear shape formed on the outer peripheral surface of the driving-side flange 129b press-fitted coaxially with the rotation shaft of the photoconductor drum 102 in the end of the photoconductor drum 102 of FIG. 22, the driving force is transmitted to the charging means 134 via a charging means gear 132a which meshes with the helical gear shape and which is disposed coaxially with the rotation shaft of the charging means (member to be driven) 134.

Moreover, as shown in FIG. 25, according to the helical gear shape formed on the outer peripheral surface of the driving-side flange 129b press-fitted coaxially with the rotation shaft of the photoconductor drum 102 in the end of the photoconductor drum 102 in FIG. 22, the driving force is transmitted via a disposal toner carrying screw gear 133a which meshes with the helical gear shape and which is disposed coaxially with the rotation shaft of the disposal toner carrying screw (member to be driven) 127.

As described above, according to the image forming apparatus of the present embodiment, the involute spline shape is formed on the inner peripheral surface of the driving-side flange 129a or 129b press-fitted coaxially with the rotation shaft of the photoconductor drum 102 in the end of the photoconductor drum 102, and the gear shapes such as the spur gear shape and the helical gear shape are formed as driving force transmission means on the outer peripheral surface. Therefore, it is unnecessary to form the driving force transmission means on a flange on a non-driving side, and it is possible to highly precisely transmit the driving force to another member to be driven while cost reduction is achieved.

Moreover, with the structure, the gears can thus be concentrated only on the driving side, and it is therefore possible to highly precisely transmit the driving force to another member to be driven while space saving is achieved.

It is also possible to combine the constitution of the first or second embodiment with the constitution of the third embodiment. In this case, the functions including the constitutions can be performed.

As described above, according to the first and second aspect of the present invention, the looseness in the peripheral and radius directions between the driving spline and follower spline is canceled, the load means such as the torque limitter is abolished, the driving load can be reduced, and miniaturization and cost reduction of a driving system of the photoconductor and the transfer material can effectively be realized.

Moreover, according to these aspects, the rotation center of the driving spline is allowed to align with the rotation center of the follower spline with good precision. Therefore, the angular speed fluctuation is reduced or canceled, and it is possible to reduce or cancel the jitter, density unevenness, and transfer position deviation of the AC component at the low cost under the simple structure. Furthermore, an advantageous effect can be obtained that it is possible to reduce or cancel the color deviation in the multi-image forming apparatus.

When the diameter or the tooth width of the tooth tip of the driving spline at the tip end in the rotation axial direction is set to be smaller than that at the root portion in the rotation axial direction, insertion of the driving spline into the follower spline can smoothly be performed without any difficulty. An advantageous effect is obtained that it is possible to facilitate the assembly operation and component change operation.

Moreover, as described above, according to the third aspect of the present invention, it is unnecessary to form the driving force transmission means on the flange on the non-driving side. An advantageous effect is obtained that cost reduction is achieved and that the driving force can highly precisely be transmitted to another member to be driven.

Furthermore, according to the third aspect of the present invention, since the gears can be concentrated only on the driving side. Therefore, an advantageous effect is obtained that space saving is achieved and that the driving force can highly precisely be transmitted to another member to be driven.

What is claimed is:

1. An image forming apparatus comprising:
   an image carrier;
   a driving unit which transmits a driving force to the image carrier; and
   a flange attached coaxially with a rotation shaft of the image carrier in one end of said image carrier and rotating with said image carrier, wherein
      driving force receiving means to which the driving force is transmitted from the driving unit is formed on an inner peripheral surface of the flange, a gear is formed on an outer peripheral surface of the flange, and at least one of a plurality of members to be driven provided in the vicinity of said image carrier is driven by the driving force transmitted from the driving unit through said gear.

2. The image forming apparatus according to claim 1 wherein said image carrier is a photoconductor drum.

3. The image forming apparatus according to claim 1 wherein said gear is one of a spur gear and a helical gear.

4. The image forming apparatus according to claim 1 wherein said member to be driven is at least one of a developing roller, charging means and a disposal toner screw.

5. An image forming apparatus comprising:
   an image carrier;
   a driving unit which transmits a driving force to the image carrier; and
   a flange attached coaxially with a rotation shaft of the image carrier in one end of said image carrier and rotating with said image carrier, wherein
      an involute spline to which the driving force is transmitted from the driving unit is formed on an inner peripheral surface of the flange, a gear is formed on an outer peripheral surface of the flange, and at least one of a plurality of members to be driven provided in the vicinity of said image carrier is driven by the driving force transmitted from the driving unit through said gear.

6. The image forming apparatus according to claim 5 wherein said image carrier is a photoconductor drum.

7. The image forming apparatus according to claim 5 wherein said gear is one of a spur gear and a helical gear.

8. The image forming apparatus according to claim 5 wherein said member to be driven is at least one of a developing roller, charging means and a disposal toner screw.

9. An image forming apparatus comprising:
   an image carrier;
   a driving unit which transmits a driving force to the image carrier via a driving spline; and
   at least one of a plurality of members to be driven which receives the driving force transmitted from the driving unit via said image carrier, wherein
      a follower spline is further attached onto a rotation shaft of said image carrier, said follower spline being positioned and connected to said driving spline so that tooth surfaces of the follower spline and said driving spline contact each other on opposite sides and gaps are formed between a tooth tip of the follower spline and said driving spline and between a tooth root of the follower spline and said driving spline, and by the driving force of the driving unit transmitted from said driving spline to said follower spline a plurality of members to be driven provided in the vicinity of said image carrier are driven.

10. An image forming apparatus comprising:
    an image carrier;
    a driving unit which transmits a driving force to the image carrier via a driving spline; and
    at least one of a plurality of members to be driven which receives the driving force transmitted from the driving unit via said image carrier, wherein
       a follower spline is further attached onto a rotation shaft of said image carrier, said follower spline being positioned and connected to said driving spline so that tooth surfaces of the follower spline and said driving spline contact each other on opposite sides, a root portion of said follower spline contacting a tooth tip of said driving spline, and a gap is formed between the tooth tip of the follower spline and said driving spline, and by the driving force of the driving unit transmitted from said driving spline to said follower spline, to said image carrier is rotated so as to rotate said plurality of the members to be driven provided in the vicinity of said image carrier.

11. The image forming apparatus according to claim 9 wherein a diameter of the tooth tip of said driving spline at a tip end in a rotation axial direction is set to be smaller than that at a root portion in the rotation axial direction and a step is formed therebetween.

12. The image forming apparatus according to claim 10 wherein a diameter of the tooth tip of said driving spline at a tip end in a rotation axial direction of said driving spline is set to be smaller than that at a root portion in the rotation axial direction and a step is formed therebetween.

13. The image forming apparatus according to claim 9 wherein a diameter of the tooth tip of said driving spline is gradually reduced toward a tip end from a root in a rotation axial direction of the driving spline or from a middle portion between the root and the tip end and a taper is formed therebetween.

14. The image forming apparatus according to claim 10 wherein a diameter of the tooth tip of said driving spline is gradually reduced toward a tip end from a root in a rotation axial direction of the driving spline or from a middle portion between the root and the tip end and a taper is formed therebetween.

15. The image forming apparatus according to claim 9 wherein a tooth width of said driving spline at a tip end in a rotation axial direction of said driving spline is set to be smaller than that at a root portion in the rotation axial direction and a step is formed therebetween.

16. The image forming apparatus according to claim 10 wherein a tooth width of said driving spline at a tip end in a rotation axial direction of said driving spline is set to be smaller than that at a root portion in the rotation axial direction and a step is formed therebetween.

17. The image forming apparatus according to claim 9 wherein a tooth width of the driving spline is gradually reduced toward a tip end from a root in a rotation axial direction of said driving spline or from a middle portion between the root and the tip end and a taper is formed therebetween.

18. The image forming apparatus according to claim 10 wherein a tooth width of the driving spline is gradually reduced toward a tip end from a root in a rotation axial direction of said driving spline or from a middle portion between the root and the tip end and a taper is formed therebetween.

19. An image forming apparatus comprising:
    an image carrier;
    a driving unit which transmits a driving force to the image carrier via a driving spline; and
    at least one of a plurality of members to be driven which receives the driving force transmitted from the driving unit via said image carrier, wherein
        a flange is further disposed coaxially with a rotation shaft of the image carrier in one end of said image carrier and rotated with said image carrier, an involute spline shaped follower spline to which the driving force is transmitted from the driving unit via the driving spline is formed on an inner peripheral surface of the flange, and driving force transmission means for transmitting the driving force to at least one of said members to be driven is formed in a predetermined gear shape on an outer peripheral surface of the flange,
        the follower spline of the flange attached on the rotation shaft of said image carrier is positioned and connected to said driving spline so that tooth surfaces of the follower spline and said driving spline contact each other on opposite sides and gaps are formed between a tooth tip of the follower spline and said driving spline and between a tooth root of the follower spline and said driving spline, and the driving force of the driving unit transmitted from said driving spline is transmitted through the driving force transmitting means so that at least one of the plurality of the members to be driven are rotated.

20. The image forming apparatus according to claim 19 wherein said image carrier is a photoconductor drum.

21. The image forming apparatus according to claim 19 wherein said driving force transmission means for transmitting the driving force to said member to be driven is one of a spur gear and a helical gear.

22. The image forming apparatus according to claim 21 wherein said member to be driven is at least one of a developing roller, charging means and a disposal toner screw.

23. The image forming apparatus according to claim 19 wherein a diameter of a tooth tip of said driving spline at a tip end in a rotation axial direction of said driving spline is set to be smaller than that at a root portion in the rotation axial direction and a step is formed therebetween.

24. The image forming apparatus according to claim 19 wherein a diameter of a tooth tip of said driving spline is gradually reduced toward a tip end from a root in a rotation axial direction of said driving spline or from a middle portion between the root and the tip end and a taper is formed therebetween.

25. The image forming apparatus according to claim 19 wherein a tooth width of said driving spline at a tip end in a rotation axial direction of said driving spline is set to be smaller than that at a root portion in the rotation axial direction and a step is formed therebetween.

26. The image forming apparatus according to claim 19 wherein a tooth width of said driving spline is gradually reduced toward a tip end from a root in a rotation axial direction of said driving spline or from a middle portion between the root and the tip end and a taper is formed therebetween.

27. An image forming apparatus comprising:
    an image carrier;
    a driving unit which transmits a driving force to the image carrier via a driving spline; and
    a plurality of members to be driven which receive the driving force transmitted from the driving unit via said image carrier,
        wherein a flange is further disposed coaxially with a rotation shaft of the image carrier in one end of said image carrier, an involute spline shaped follower spline to which the driving force is transmitted from the driving unit via the driving spline is formed on an inner peripheral surface of the driving-side flange, and driving force transmission means for transmitting the driving force to at least one of said members to be driven is formed on an outer peripheral surface of the flange,
        the follower spline of the flange attached to the rotation shaft of said image carrier is positioned and connected to said driving spline so that tooth surfaces of the follower spline and said driving spline contact each other on opposite sides, a root portion of the follower spline also contacts a tooth tip of said driving spline and a gap is formed between the tooth tip of the follower spline and said driving spline, and the driving force of the driving unit transmitted from said driving spline is transmitted to said image carrier so that the image carrier is rotated.

28. The image forming apparatus according to claim 27 wherein said image carrier is a photoconductor drum.

29. The image forming apparatus according to claim 27 wherein said driving force transmission means for transmitting the driving force to said member to be driven is one of a spur gear and a helical gear.

30. The image forming apparatus according to claim 27 wherein said member to be driven is at least one of a developing roller, charging means and a disposal toner screw.

31. The image forming apparatus according to claim 27 wherein a diameter of the tooth tip of said driving spline at a tip end in a rotation axial direction of said driving spline is set to be smaller than that at a root portion in the rotation axial direction and a step is formed therebetween.

32. The image forming apparatus according to claim 27 wherein a diameter of the tooth tip of said driving spline is gradually reduced toward a tip end from a root in a rotation axial direction of said driving spline or from a middle portion between the root and the tip end and a taper is formed therebetween.

33. The image forming apparatus according to claim 27 wherein a tooth width of said driving spline at a tip end in a rotation axial direction of said driving spline is set to be smaller than that at a root portion in the rotation axial direction and a step is formed therebetween.

34. The image forming apparatus according to claim 27 wherein a tooth width of said driving spline is gradually reduced toward a tip end from a root in a rotation axial direction of said driving spline or from a middle portion between the root and the tip end and a taper is formed therebetween.

* * * * *